(12) United States Patent
Horn

(10) Patent No.: US 7,181,702 B2
(45) Date of Patent: Feb. 20, 2007

(54) SYSTEM AND METHOD TO SOLVE SHAPE NESTING PROBLEMS

(76) Inventor: Jeffrey Horn, Box 418J R.R. 1, Negaunee, MI (US) 49866

(*) Notice: Subject to any disclaimer, the term of this patent is extended or adjusted under 35 U.S.C. 154(b) by 199 days.

(21) Appl. No.: 10/927,728

(22) Filed: Aug. 27, 2004

(65) Prior Publication Data

US 2005/0122346 A1    Jun. 9, 2005

Related U.S. Application Data

(60) Provisional application No. 60/498,769, filed on Aug. 30, 2003.

(51) Int. Cl.
*G06F 17/50* (2006.01)
*G09G 5/00* (2006.01)

(52) U.S. Cl. .......................... 716/2; 345/629
(58) Field of Classification Search .............. 716/2, 716/7–10; 345/629

See application file for complete search history.

(56) References Cited

OTHER PUBLICATIONS

Goldberg, David E., et al., "Genetic Algorithms with Sharing for Multimodal Function Optimization", Proceedings of the Second International Conference on Genetic Algorithms in Hillsdale, New Jersey, 1987, pp. 41-49, Lawrence Erlbaum Associates.

Goldberg, David E., "Genetic Algorithms in Search, Optimization, and Machine Learning", 1989, pp. 125-139, Addison-Wesley Publishing Company, Inc.

Goldberg, David E., et al., "Massive multimodality, deception, and genetic algorithms", Proceedings of the Second Conference on Parallel Problem Solving from Nature in Brussels, Belgium, Sep. 28-30, 1992, pp. 37-46, Elsevier Science Publishers, Amsterdam, The Netherlands.

Horn, Jeffrey, "Finite Markov Chain Analysis of Genetic Algorithms with Niching", Proceedings of the Fifth International Conference on Genetic Algorithms at the University of Illinois at Urbana-Champaign, Jul. 17-21, 1993, pp. 110-117, Morgan Kaufmann Publishers, San Mateo, California.

Horn, Jeffrey, et al., "Implicit Niching in a Learning Classifier System: Nature's Way", Evolutionary Computation 2(1), 1994, pp. 37-66, Massachusetts Institute of Technology.

Horn, Jeffrey, et al., "A Niched Pareto Genetic Algorithm for Multiobjective Optimization", Proceedings of The First IEEE Conference on Evolutionary Computation at Walt Disney World Dolphin Hotel, Orlando Florida, Jun. 27-29, 1994, pp. 82-87.

MahFoud, Samir W., "Niching Methods for Genetic Algorithms", Ph.D. Dissertation from University of Illinois, 1995, pp. 155-162, University of Illinois, Urbana, Illinois.

Horn, Jeffrey, et al., "Natural Niching for Evolving Cooperative Classifiers", Proceedings of the First Annual Conference, Genetic Programming, 1996, pp. 553-563, The MIT Press, Cambridge, Massachusetts.

Dighe, Rahul, "Solving Pattern Nesting Problems with Genetic Algorithms Employing Task Decomposition and Contact Detection", Evolutionary Computation 3(3), 1996, pp. 239-266, Massachusetts Institute of Technology.

Horn, Jeffrey, "The Nature of Niching: Genetic Algorithms and the Evolution of Optimal, Cooperative Populations", Ph.D. Dissertation from University of Illinois, 1997, University of Illinois, Urbana, Illinois.

Horn, Jeffrey, "Multicriteria Decision Making and Evolutionary Computation", The Handbook of Evolutionary Computation, 1997, Oxford University Press, New York, New York.

(Continued)

*Primary Examiner*—Stacy A Whitmore
(74) *Attorney, Agent, or Firm*—Blakely, Sokoloff, Taylor & Zafman LLP

(57) ABSTRACT

The present invention is an iterative, population-based method with a special selection process applied to a certain type of industrial design problem. Specifically, the selection method incorporates resource-defined fitness sharing (RFS) to compute the selective advantage of each member of the current population.

63 Claims, 17 Drawing Sheets

OTHER PUBLICATIONS

Horn, Jeffrey, et al., "A Timing Analysis of Convergence to Fitness Sharing Equilibrium", 5th International Conference on Parallel Problem Solving from Nature in Amsterdam, The Netherlands, Sep. 27-30, 1998, pp. 23-33, Springer-Verlag, Germany.

Horn, Jeffrey, et al., "Toward a Control Map for Niching", Foundations of Genetic Algorithms 5, 1999, pp. 287-310, Morgan Kaufmann Publishers, Inc., San Francisco, California.

Horn, Jeffrey, "Controlling the Cooperative-Competitive Boundary in Niched Genetic Algorithms", Proceedings of the Genetic and Evolutionary Computation Conference in Orlando, Florida, Jul. 13-17, 1999, pp. 305-312, vol. 1, Morgan Kaufmann Publishers, San Francisco, California.

Kendall, Graham, "Applying Meta-Heuristic Algorithms to the Nesting Problem Utilising the No Fit Polygon", Ph.D. Dissertation from University of Nottingham, Oct. 2000, University of Nottingham, Nottingham.

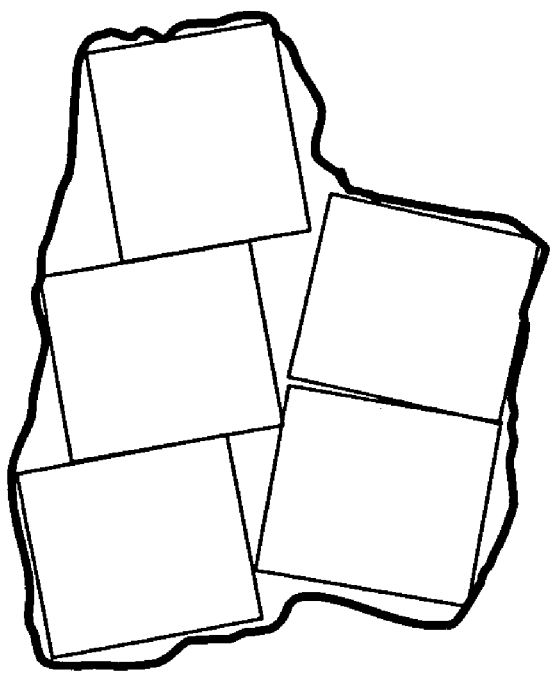
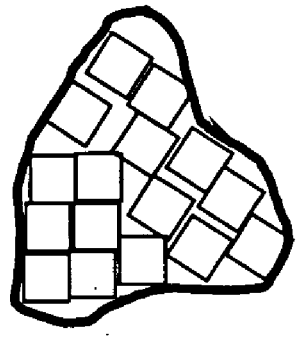
Figure 10b
Figure 10a
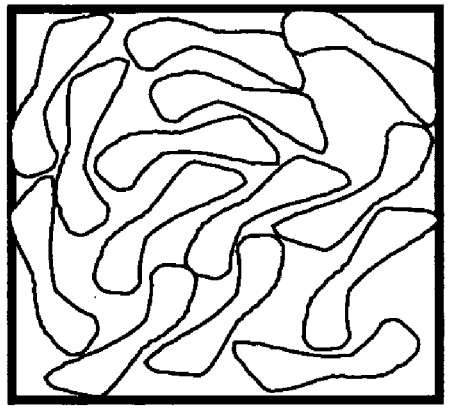
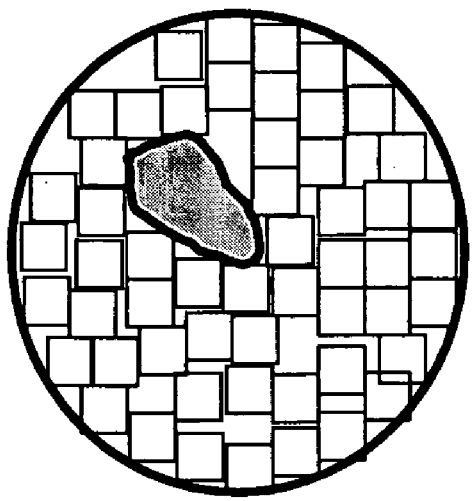
Figure 10c                    Figure 10d generation 0 (initial population)

species_count ≥ 2 species_count ≥ 1 generation 209 species_count ≥ 36 species_count ≥ 2

SYSTEM AND METHOD TO SOLVE SHAPE NESTING PROBLEMS

CROSS-REFERENCE TO RELATED APPLICATION

This application claims the benefit of U.S. Provisional Patent Application No. 60/498,769 filed Aug. 30, 2003.

COMPUTER PROGRAM LISTING APPENDIX

A computer program listing appendix incorporating features of the present invention is being submitted herewith on a compact disc in compliance with 37 C.F.R. §1.52(e), and is incorporated herein by reference in its entirety. The computer program listing appendix is being submitted on a first compact disc labeled "COPY 1" and on a second compact disc labeled "COPY 2." The disc labeled Copy 2 is an exact duplicate of the disc labeled Copy 1. The file contained on each disc is:

RFS_code_PPA (created Aug. 25, 2004, 16,000 bytes)

BACKGROUND OF THE INVENTION

1. Field of the Invention

The present invention relates to a system and method for determining an optimal (or sufficiently near-optimal) solution to a shape-nesting problem (also commonly referred to as a "cutting-stock", "trim-loss-minimization", packing, or layout, problem, among other names), in one, two, or three dimensions, in which the pieces to be nested can be moved about in one, two, or three dimensions and possibly rotated so as to achieve a maximally dense nesting. The system and method of the invention include the data processing machine on which a program for determining the optimal solution runs, and the storage medium on which this program is stored.

2. Prior Art

Population-based, iterative improvement algorithms such as Genetic Algorithms (GAs) have been applied to a wide range of industrial problems. GAs are particularly effective at finding optimal, or near-optimal, solutions to problems with large numbers of decision variables and consequently large numbers of possible solutions (*Genetic Algorithms in Search, Optimization, and Machine Learning*, Goldberg, D. E., 1989).

One problem domain in which iterative, population-based approaches such as GAs have had some success is that of "shape nesting". In many industries there is a need to cut many copies of a particular two dimensional shape from a two dimensional piece of material. For example, in the automobile industry, a particular shape of sheet steel needs to be cut from a large roll of sheet steel, to be later formed into a door panel for a new car. Often, the manufacturer wishes to cut as many of these "shaped pieces" as possible, from a single flat piece of raw material (herein known as the "substrate"). Maximizing the number of pieces cut from the substrate makes the most use of costly raw materials, minimizing "trim" or "waste".

In another example of a shape-nesting domain, a user might wish to cut as many copies as possible of a particular dress pattern from a single bolt of cloth. Other real-world examples of shape nesting problems come from the paper industry and the wood products industry, all of which involve cutting small identical shapes from large "blanks" or "cutting stock" while minimizing unused substrate material (i.e., "trim"). "Resource-Based Fitness Sharing", Horn, J., 2002, Parallel Problem Solving From Nature, PPSN VII, Lecture Notes in Computer Science 2439, provides more background on the problem domain, and more references to the literature and is incorporated herein by reference in its entirety.

Thus the challenge in many industries is to find an arrangement (sometimes called "nesting" or "layout") of the shaped pieces on the substrate so that (1) there is no overlap between different pieces, (2) each shaped piece is entirely contained on the substrate (it is required to cut whole shapes out), and (3) the number of such non-overlapping, complete shaped pieces is maximized. This is, in general, a hard problem. In the general case, the pieces to be cut can have arbitrary shapes (e.g., the collar of a shirt, to be cut from a bolt of fabric), the substrate can have arbitrary shape (e.g., cutting identical flagstones from a rough slab of granite), and the placement of the pieces can include not only translational location (the x,y coordinate of the piece in the Cartesian plane) but also the orientation (angle), as the pieces can be rotated in order to make them "nest" more neatly and hence "pack" more closely.

Prior to this invention, genetic algorithms (GA) have been applied to shape-nesting problems in the literature. In most of these GA approaches, the shape-nesting problem was encoded in the "traditional way", in that each individual chromosome in the population of chromosomes represented a complete solution to the nesting problem at hand. One limitation of this approach is that the chromosome becomes long and complex, due to the fact that it is encoding the entire solution, which means specifying the placement (that is, location and orientation) of each of the pieces on the substrate. Longer and more complex chromosomes make it more difficult and complex to design effective "discovery operators" (e.g., crossover, mutation), and require vastly more computation (i.e., larger population sizes and longer run times).

In his 1997 Ph.D. thesis, "The Nature of Niching: Genetic Algorithms and the Evolution of Optimal, Cooperative Populations" (1997), Jeffrey Horn introduced a "speciation approach", in which the genetic algorithm is used to evolve a SET OF SPECIES, which together represent a solution to the shape-nesting problem at hand. Each chromosome in the population represents just one piece (by encoding the piece's location and orientation), with different subsets of the population representing different solutions to the problem at hand. This approach leads to simpler discovery operators, smaller population sizes, and shorter run times. Horn demonstrated the idea in a one dimensional nesting problem using "fitness sharing" ("Genetic algorithms with sharing for multimodal function optimization", Goldberg, D. E., et al., 1987, Proceedings of the 2nd International Conference on Genetic Algorithms) to induce speciation. A fundamental limitation of fitness sharing is that it assumes each species occupies a fixed-radius "niche". For shape nesting this means that the fitness sharing approach can only nest spherical shapes (e.g., circles in the two dimensional case). So Horn also suggested resource sharing as an alternative speciation method. (He did not implement resource sharing for shape nesting, nor did he discuss in any detail exactly how to do so.) Resource sharing would allow the nesting of pieces with arbitrary shapes.

Unfortunately, experiments and analysis since 1997 (Horn, 2002) indicate that resource sharing introduces instability to the GA, resulting usually in convergence to suboptimal solutions.

So the current situation (which is the prior art with regard to iterative, population-based approaches to shape-nesting problems) can be summarized as follows:

1. GA approaches without speciation require large, complex chromosomes which in turn require complex GA operators, which together require massive computation,
2. "Speciation GA" approaches using fitness sharing greatly simplify the chromosome, operators, and computation required, but only work for nesting one shape: n-dimensional spheres (circles, in 2D), and
3. Speciation GA approaches using resource sharing work for arbitrary shapes, but perform very poorly.

What is different about this invention is the use of a unique, new method of speciation in a GA (or similar, population-based, iterative improvement algorithm) applied to shape nesting: "resource-defined fitness sharing" (RFS). RFS is a synthesis of the fitness sharing and resource sharing processes for inducing species. RFS utilizes actual resource coverage, like resource sharing, so that pieces with arbitrary shape can be nested. But unlike resource sharing, and more like fitness sharing, RFS emphasizes pairwise interactions among species, and then sums the quantitative effects of the pairwise interactions to produce a single "niche count" for each individual in the population, similar to the niche count in fitness sharing, thereby avoiding the unstable and suboptimal performance of resource sharing.

BRIEF DESCRIPTION OF THE DRAWINGS

FIG. 1 provides graphic examples of the inputs and the output (optimal solution).

FIG. 10 shows some additional examples of the kinds of shape nesting problems that can be solved using the present invention.

DESCRIPTION OF THE TERMS

Figure 1:
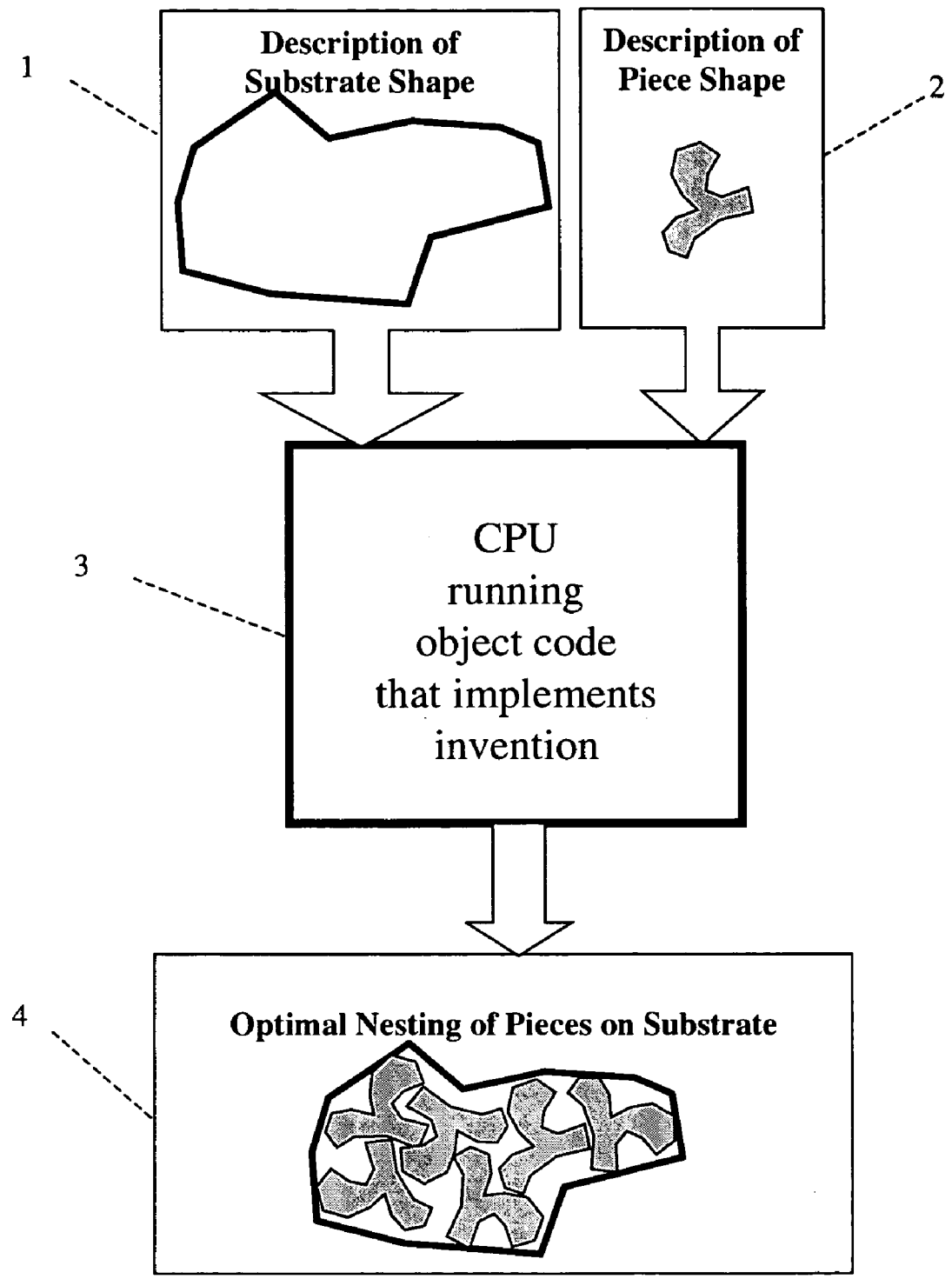
FIG. 1 is a block diagram that portrays an apparatus that seeks an optimal solution according to one embodiment of the present invention.

Allele—An actual value for a gene on a chromosome. Thus for example one gene on a chromosome (e.g., the third gene from the left end of a string, or "linear", chromosome) might specify an angle of rotation. The alleles would be the actual numbers specifying an angle. For example, an allele of 35.4 for the third gene on the chromosome would mean a rotation of 35.4 degrees. Thus the "gene" for rotation angle is the position on the chromosome encoding that value. The "allele" is the actual value (in this case a number) of that gene.

Blank nesting—A subcategory of the shape nesting problem, found in the steel products industry (e.g., automotive) in which the 2D "blank" is the shaped piece, which, once cut from the substrate (e.g., sheet steel), is then stamped or otherwise formed into the 3D shaped part.

Chromosome—The structure that encodes a possible solution (or sometimes a part of a possible solution) to the problem at hand. Each chromosome can thus be "decoded" to a set of values that specify a complete (or for some GAs, a partial) solution. Each individual in the GA population contains exactly one chromosome. Since the chromosome completely encodes a solution (or completely encodes a partial solution), the chromosome is the most important, and most unique, part of an individual. Hence, the words "chromosome" and "individual" are often used interchangeable in the GA literature. The typical chromosome, describing a complete solution to the problem, is a finite list of values, one for each of the decision variables that define the problem. For example, if the problem is defined as finding an optimal width and height, and the ranges for width and height both are 0 to 1 meter, then one chromosome might be "(0.43, 0.17)", specifying a width of 0.43 meters, and a height of 0.17 meters. Chromosomes can be recombined with each other to form new chromosomes containing some values from one parent, and some values from the other. Chromosomes can be mutated by making small changes in a small number of the decision variables. Chromosomes are typically implemented in a program as a data structure of some kind, such as an array or linked list for the example of a "linear" chromosome given here, or as a more complex data structures for other types of chromosome structures, such as the tree-structured chromosomes common in genetic programming (GP).

CPU—Central Processing Unit. The main processing unit of hardware and center of control of modern-day computers. Many modern computer systems actually consist of several CPUs, including multi-processor computers, cluster computers, networks of workstations, distributed parallel processors, centralized (tightly coupled) parallel processors, and massively parallel processors. For the purpose of simplifying the discussion of the operation of the present invention, a single CPU is shown, but could represent a multiplicity of processors in practice.

Crossover—A particular family of recombination operators. Crossover operators are the most common type of recombination operator used in the GA literature (Goldberg, 1989). Almost all variants use two parent individuals to produce one or more offspring individuals. In general, crossover operators create offspring combining genetic information from both parents by copying "portions" (or "parts") from one parent or the other. A typical example of a crossover uses a linear chromosome, that is, a string of genes. Let there be five genes in the chromosome: x1, x2, x3, x4, x5, and two parent individuals A and B. A "one-point crossover" operator picks (at random) one of the five genes to be the crossover point, say for example x3. Then it forms one child by taking the values of x1, x2, and x3 from parent A, and the values for the rest of the genes, x4 and x5, from parent B. A second ("complementary") child can be formed by taking gene values for x1, x2, and x3 from parent B, and the values for x4 and x5 from parent A. This example illustrates just one way to perform crossover.

Cutting stock problem—Another common name for the shape-nesting problem, in which the substrate is called the "cutting stock".

Decision variables—Defined by the problem at hand. These are the critical, independent parameters of the problem. Finding the proper values (or "settings") of the decision variables solves the problem. For example, if the problem is to find the optimal voltage and temperature at which to run device, then these two quantities are the decision variables. Decision variables are encoded on the chromosome of a GA.

Discovery operators—GA operators, such as mutation and crossover, that create NEW individuals from old ones. For example, mutation changes one allele (i.e., gene value on the chromosome) in an individual, creating a different individual. In contrast, GA operators such as proportionate selection, or elitist selection, simply make identical copies of individuals while deleting other individuals, and thus do not introduce any new individuals. But there is no guarantee, in general, that discovery operators will produce "completely new" individuals that have never been seen in the population so far. In addition, because discovery operators can sometimes be detrimental, destroying good genetic material (alleles) in attempts to find better material, GA practitioners usually apply discovery operators with care. For example, practitioners often use intermediate values for the probabilities of applying these operators (e.g., 50% for the probability of applying crossover).

Encoding—A mapping of the decision variables of the problem at hand to locations or structures (i.e., "genes") on a chromosome, for subsequent exploration and optimization by a genetic algorithm (GA) or similar evolutionary technique or other population-based, iterative improvement algorithm. Typically, an expert on the technique works with an expert on the problem domain to determine the key decision variables of the problem, the range of their possible values, and then choose how and where on the chromosome to place the genes representing those decision variables.

Ensemble—A subset of the species in the population. Technically, any subset of species in the current population is an ensemble. However, this term comes from the recently emerged filed of "cooperative evolution", in which individuals in the population influence each other's fitness (e.g., see definition here of shared fitness), and the goal is to evolve an ensemble of different individuals (that is, species) that together represent a solution to the problem at hand. Usually, what is desired of an ensemble is that it be a subset of species that cooperate somehow to solve a problem. In general, the final population in the run of a cooperative evolution GA contains many ensembles (that is, many subsets of species from among all the species present in the final population). Thus it is typical to require some kind of "post-processing" to extract the optimal ensemble, and thus the optimal solution, from the last generation (that is, the final population).

Fitness—A figure of merit defined by the problem at hand. Fitness is a value, typically a number, assigned to each individual in the population by a fitness function, determined by the problem at hand. The fitness is a function of the individual; that is, it is a function of the values specified in the chromosome of the individual. The alleles (values) of the genes in the chromosome are decoded, interpreted as the settings of the decision variables of the problem, and then evaluated as a solution to the problem. The resulting numeric fitness is usually proportional to how well the solution proposed in the chromosome solves the problem. In "maximization problems", the higher the fitness the better the solution, while in "minimization problems" the lower the fitness the better the solution. In this document, maximization problems are assumed.

GA—Genetic algorithm.

Gene—A location (locus), or set of locations (loci), on the chromosome that encodes a particular trait. For example, on a string (that is, linear) chromosome, the first position might be a number that encodes the angular orientation of an individual, as an integer from 0 to 359 degrees. The integer here is the gene, while the actual value in a particular chromosome, for example 105°, is the allele.

Genetic algorithm (GA)—A population-based, iterative improvement algorithm developed in the 1970s. Typically, GAs involve a population of potential solutions to a problem at hand, in which population members are chromosomes, each encoding a setting of the decision variables defined by the problem. Every generation the individuals in the population are each evaluated as solutions to the problem, and rated with a fitness value. Each generation, typical GA operators such as selection, crossover, and mutation are applied to the current population to yield a new population with some new individuals. The selection operator is biased toward reproducing higher fitness (better) individuals, while operators like crossover and mutation manipulate the genetic material of individuals in the population in order to discover new individuals. Together, the selection operator(s) and the discovery operator(s) act to find, reproduce, and experiment with, better fit individuals over the successive generations (Goldberg, 1989).

Genetic operators—The operators are the procedures that act upon the members (individuals) of the population each generation. One critical operator that must be present is selection. Selection acts on the entire population to produce a new one. Crossover is an operator that acts on pairs of individuals to create one or more new, but similar, individuals. Mutation is an operator that acts on a single individual.

There are other possible genetic operators.

Hillclimbing (as a local optimizer)—A common type of discovery operator for GAs is a local optimizer. These essentially operate on an individual by testing small changes, like mutations, to the chromosome to see which, if any, result in an improvement (that is, higher fitness). A hillclimbing local optimizer would keep the chromosome change that improved fitness the most, and then continue to look for improvements to the newly modified chromosome, thus "climbing" the local gradient in the "fitness landscape. Hillclimbers stop when local improvements are no longer possible. Thus hillclimbing operators can explore the local neighborhood of small changes to an individual and climb to the top of the nearest "hill in the fitness landscape", which represents a local optimum. Some GA practitioners and researchers have found such local optimizers helpful.

Individual—An individual is a member of the population. The most important part of an individual is the chromosome which encodes a possible solution to the problem at hand (or in the case of the invention here, a part of the solution). Often, the terms "individual" and "chromosome" are used interchangeably. Each individual has its own copy of a chromosome, with its own settings of the decision variables encoded thereon. Different individuals in the population might have the same values on their chromosomes. Such individuals are called "identical", as they are copies of each other, and are both members of the same "species". Individuals, actually their chromosomes, are acted upon by genetic operators.

Local optimizer—See hill climbing.

Mutation—This is a genetic operator that changes a single individual in some random, usually small, way. A typical type of mutation is to randomly choose one of the genes on the individual's chromosome and change its value slightly. For example, mutation might change the (x,y,z) coordinates encoded in a chromosome from (23, 48, 16) to (23, 45, 16). Because mutation operators are considered to be somewhat disruptive (they are likely to change good gene values to bad ones as they are to change bad ones to good ones), it is typical in practice to use mutation sparingly, by setting the "probability of mutation" to a low value, often less than 1%.

Population—This is simply the finite set of individuals upon which act the genetic operators. The population is typically of fixed size M (which might reasonably be in the range of M=100 to M=40000). Every generation the population undergoes selection, and perhaps recombination (e.g., crossover), mutation, or other genetic operators, to create a new population (but of same fixed size M).

Population size—The number of individuals in the population. Typically fixed at the start of a run. In this document the letter M refers to the population size. Typical population sizes vary from M=50 to M=50,000 or more.

Recombination (operator)—A typical type of discovery operator in a genetic algorithm, usually involving two chromosomes, the "parents", whose genetic codes (e.g., alleles) are recombined to form one or more child chromosomes (or "offspring"), each of which contains some of the genetic material from EACH of the parents. The most common type of recombination is crossover, at least in the field of computer-based genetic algorithms.

Selection—The Genetic Algorithm operator that is applied to an entire population, to produce a new population. Most GA selection methods are randomized, with a bias toward selecting and reproducing individuals with higher fitness. Thus individuals from the original population with very high fitness will have a greater chance of being selected for the next population (generation) than individuals with lower fitness. In this way, high-fitness individuals will often be selected multiple times, with the result that there will likely be more copies of high fitness individuals in the next population than there are in the original population.

Shape nesting—A general problem with many instances in a variety of industries. It is the general problem of finding an "optimal" way to place shaped pieces on a substrate of some kind so that none of the shaped pieces overlap each other, so that each shaped piece is entirely contained on the substrate, and so as to maximize the amount of substrate "covered" (or "used") by the shaped pieces (or, equivalently, to minimize the amount of "trim", which is unused substrate). The shaped pieces can all be identical (in shape and size), in which case the shape nesting problem can be characterized as the maximization of the number of identical shaped pieces that can be positioned on the given substrate without overlapping each other or the edge of the substrate. Shape nesting problems are typically two dimensional, and are common in many industries, from sheet metal, to textiles and paper cutting.

Shared fitness—the "re-computed" fitness of an individual in the population of a genetic algorithm, in which the original, or objective fitness, of an individual is modified by the presence of other individuals in the population. Typically, the fitness is "shared" with other individuals in the population according to how similar these individuals are to the given individual. The motivation behind shared fitness calculations is to simulate natural competition for limited resources. Thus individuals with similar chromosomes (that is, similar alleles) would probably compete for the same resources in the natural world, so in the GA (with some kind of sharing implemented), the normal, objective fitness is typically divided by some value, sometimes known as a niche count, which is a function of the number of similar individuals in the current population: the more similar individuals, and/or the more similar those individuals, then the larger the niche count and therefore the smaller the shared fitness. By making an individuals shared fitness decrease as the individual becomes more "crowded" by similar (or identical) individuals in the population, the intended general effect is to keep the evolving population from converging to a single species, thereby maintaining diversity.

Species—Each unique chromosome is considered a separate species. Thus individuals with identical chromosomes are considered members of the same species. Two chromosomes are identical if and only if the two chromosomes have the exact same alleles (that is, values for each gene on the chromosome). For example, if the problem at hand calls for chromosomes to encode an x,y location followed by a temperature, as in "(x,y,temp)", then the two chromosomes (26,70,15°) and (26,70,18°) represent two different species, while (4,18,5°) and (4,18,5°) are part of the same species.

DETAILED DESCRIPTION

The subsections below describe the problem to be solved, how the invention approaches the problem, and then describe the operational details.

The Shape Nesting Problem:

While this invention can be applied to shape nesting problems in one, two, or three spatial dimensions, the domain of two dimension shape nesting problems is here used to illustrate.

The essential characteristics of a two-dimension shape nesting problems include:
1. a two-dimensional "substrate" of some material with a defined boundary of any shape (see FIG. 1 reference numeral 1),
2. a two-dimensional shape defining the "pieces" to be "cut" from the substrate, (see FIG. 1, reference numeral 2),
3. the goal of cutting as many of these "shaped pieces" (in 2 above) from the substrate (in 1 above), where each cut piece must be of the defined shape, and therefore must be complete and whole.

The size (which is area, in the two dimensional case) of the shaped piece must be smaller than that of the substrate, or else it would not be possible to cut even one piece from the substrate. Each of the pieces is identically shaped. While the surface of the substrate is two dimensional, it does not have to be perfectly flat. For instance, the problem at hand could be the cutting of shaped pieces from the surface of a cylinder, torus, cone, or sphere. The important quality of the substrate is that it be n-dimensional (where n=2 in the current example) and finite.

Figure 11A:
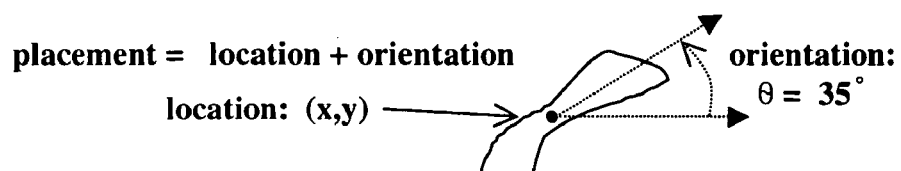
FIG. 11 shows one possible implementation of one preferred embodiment of the invention, in which the placement data (location and orientation) of each shaped piece is encoded on the chromosomes, then decoded for placement on the substrate, and calculation of shared fitness based on the extent to which the placed piece is overlaps the substrate and overlaps other pieces.
Figure 11B:
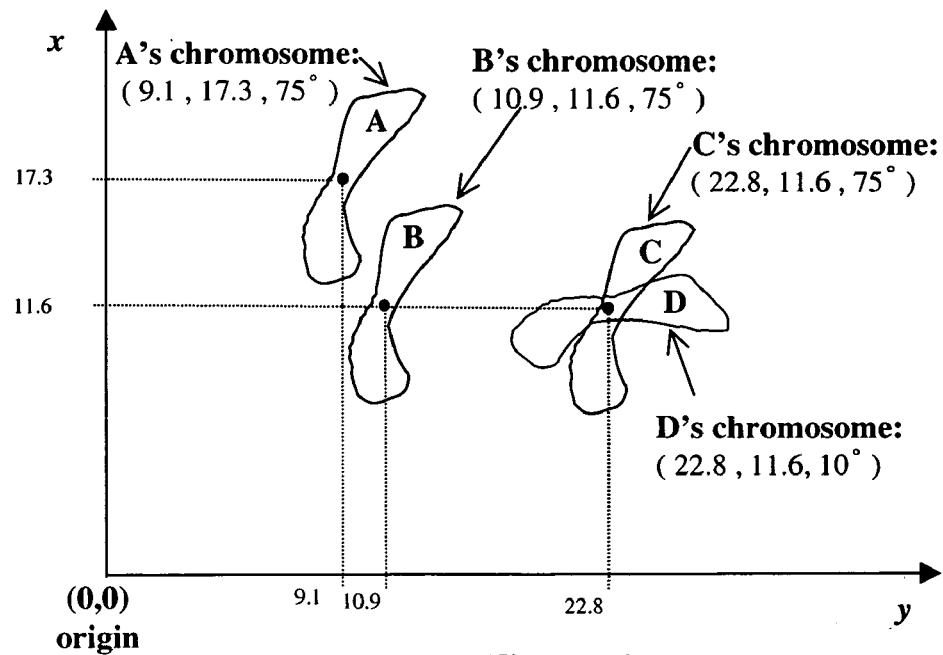
Figure 11C:
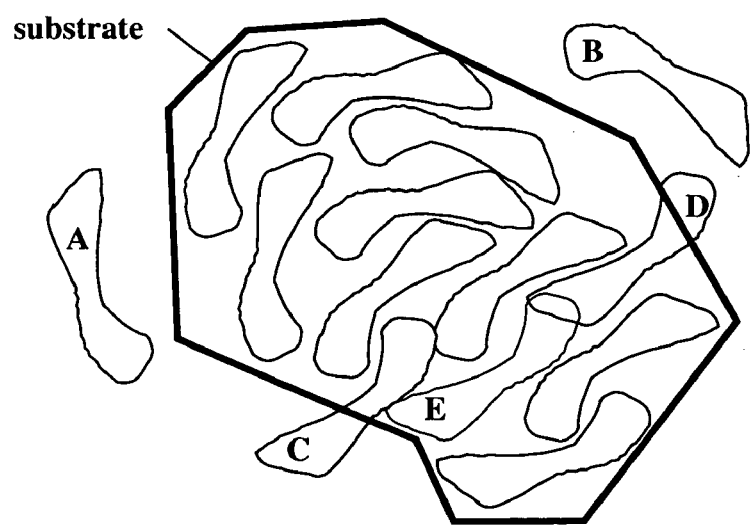

These requirements of the problem mean that a user wants to find a way to "fit" or "pack" as many of the shaped pieces from the substrate as possible, and that the user is not interested in any "designs" (i.e., layouts, fittings, or packings) that include overlapping pieces, or pieces that "hang over" the sides of the substrate (and thus when cut from the substrate would yield incomplete shapes), such as pieces A, B, C, and D in FIG. 11c.

So the goal of the problem at hand is to find a placement (i.e., layout, packing, etc.) of the pieces such that no pieces extend beyond the boundary of the substrate and no two pieces overlap. The optimal solution is the one that maximizes the number of such pieces without violating the two mentioned constraints (i.e., no overlaps with each other, or with substrate boundary). FIG. 1, reference numeral 4 shows an example optimal solution.

Note that the placement specification describes the exact location (and orientation) of each piece on the substrate.

The problem is easily generalized to three dimensions, in which the goal is to cut as many copies of a given three dimensional shape from a given, bounded, three dimensional volume of material. Note also that this material could very well be simply empty space, such as the space bounded by a one, two, or three dimensional container, in which case the nesting problem is really one of packing an empty space with as many identically shaped objects (i.e., the shaped pieces) as possible. So the substrate does not have to be a solid material. It only has to be finite and bounded.

Figure 2:
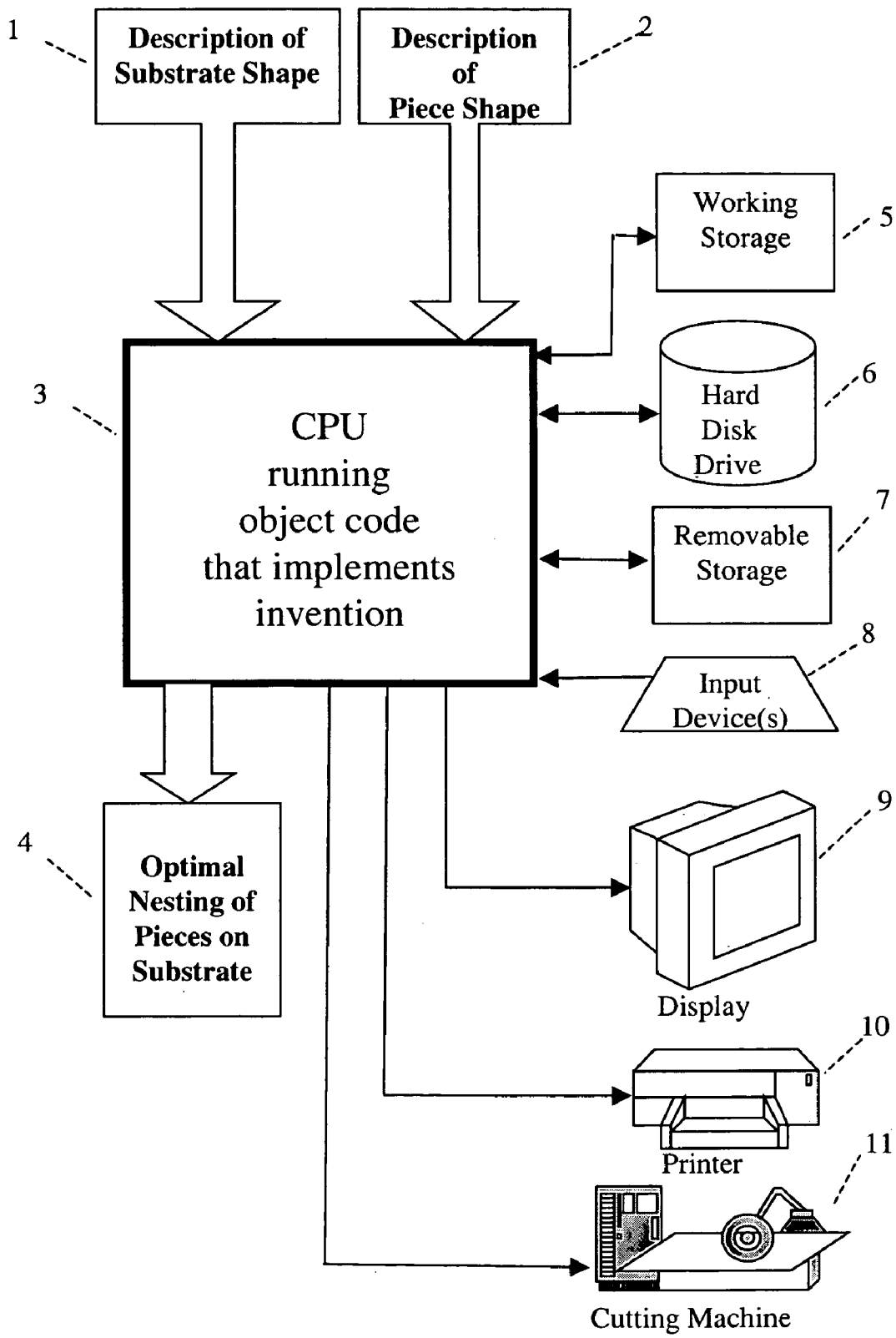
FIG. 2 is a block diagram showing, in more detail than in FIG. 1, the configuration of an apparatus that seeks an optimal solution according to one embodiment of the present invention.

Overall Approach of the Invention to the Problem:

FIG. 2 shows the overall approach of the present invention to the shape-nesting problem described above.

FIG. 2 shows the problem data (shape descriptions) being input to the general purpose computer programmed to run an implementation of the invention. The computer runs the program, possibly interacting with the user through a display and input device(s), and using memory (e.g., working storage, or hard disk drive). When an optimal solution is determined, that solution, which is a description of an optimal nesting of the pieces on the substrate, is output to the user, an electronic file, or directly to a machine that implements the solution (e.g., by cutting the pieces according to the specified piece placements in the solution).

Specifically, FIG. 2, reference numerals 1 and 2 show the problem-specific data described above, namely the shape descriptions for both the substrate and the piece to be cut from the substrate. These data are input to the data processor (FIG. 2, reference numeral 3) which is running the software method of the present invention. Such shape descriptions can be input in a variety of ways, such as in an electronic form using standard shape description languages, or via an interactive session with a user at a computer display (FIG. 2, reference numeral 9) and input device (e.g., mouse and keyboard, see FIG. 2, reference numerals 7 and 8), through the use of a commercial or custom-designed software package (e.g., AutoCAD).

The computer then runs the iterative portion of the invented method (reference numeral 3, the Central Processing Unit or CPU). (Population-based algorithms are often modified to run on multiple processors, interconnected by a data bus, communications network, or other medium, by dividing the population into multiple subpopulations which are evaluated in parallel. For ease of discussion, most of this specification speaks of one CPU, but a multiplicity of CPUs could be substituted.)

A human user can interact with the running program through a computer display (FIG. 2, reference numeral 9) and input device(s) (FIG. 2, reference numerals 7 and 8) in order to adjust algorithm run-time parameters (e.g., population size, etc.), and to check on the status of a run, perhaps to terminate the run when the current solution looks optimal. When the program has determined an optimal solution, that is a nesting of the pieces on the substrate (FIG. 2, reference numeral 4), it outputs this nesting either directly to a machine (FIG. 2, reference numeral 11) that cuts the pieces from the substrate using the optimal solution as a cutting guide, or indirectly to such a machine by first sending the nesting solution to the user through a screen display (FIG. 2, reference numeral 9) or a printer (FIG. 2, reference numeral 10), or by storing the solution in an electronic file temporarily stored on a hard drive (FIG. 2, reference numeral 6), working memory (FIG. 2, reference numeral 5), or other electronic or optical removable storage medium (FIG. 2, reference numeral 7; e.g., magnetic tape, compact disk (CD), digital versatile disk (DVD), FLASH memory device, etc.), or by sending the file out over a computer network (not shown in FIG. 2), all for eventual use by a machine (FIG. 2, reference numeral 11) or human (not shown in FIG. 2) to actually cut the pieces from the substrate according to the optimal solution.

Mapping the Population-Based Algorithm to the Problem:

To apply any type of population-based, iterative improvement algorithm, the decision variables of the problem at hand must be encoded into a chromosome, to be represented by members of the population. The iterative algorithm, such as a GA, will then generate and maintain a population of chromosomes, each representing a possible solution to the problem. Each chromosome will be "decoded" into its corresponding "hypothesis" (i.e., candidate solution), and evaluated as to its ability to solve the problem. The result of the evaluation is the chromosome's "fitness".

For the shape nesting problem, the chromosome represents the placement of a shaped piece on the substrate. Thus the chromosome should encode the relevant decision variables that define an exact location and orientation. (In many cases, the orientation of the pieces will be fixed, for example if all pieces have to aligned with the "grain" or orientation of the substrate. In such cases, the piece orientation is not a decision variable, and left out of the encoding.)

Typically location is defined in some coordinate system. In the examples used here and in (Horn, 2002), the Cartesian coordinate system is used. Thus for one-dimensional problems, the pieces' position on the horizontal (or "x axis") is used, while for two dimensions the ordered pair (x,y) defines the horizontal and vertical positions. And for three dimensions, all three axes (x,y,z) would be used. The coordinates (e.g., x,y,z) can be integer or real-valued. They can specify the centers of each shape, or the "upper-left corners" for example, but their meaning must be the same for all pieces/chromosomes, so that each such coordinate uniquely defines a position in the substrate's "space" (e.g., area or volume).

In addition to the Cartesian location of a piece, the problem might also call for the orientation of the piece to be manipulated, and thus encoded in the chromosome. In such a case, one way to add the orientation specification would be to specify the angle of "rotation" of the piece from some standard orientation. For example, for a two-dimensional problem, the encoding might look like this: chromosome A: (248, 322, 72), where the first two numbers give the x,y position of the piece's center, while the last number, 72, is the angle to rotate the piece, in the plane, from the common reference direction (say, "due North" for example).

Once the decision variables are identified, the algorithm implementor then decides how they are placed on the chromosome. A typical way to do this is to simply place them linearly, so that the chromosome is a "string" of decision variables (as in the example of (248, 322, 72) in the paragraph above). These decision variables might be encoded as binary numbers, integers, or real numbers (i.e., floating point) in the data structure that actually holds the chromosome during computation.

FIG. 11 illustrates such an encoding for two dimensions. In FIG. 11a, the shaped piece shown is moved about on the substrate by changing the (x,y) coordinate of its center (indicated by the solid black circle in FIG. 11a), and rotated by changing is orientation angle θ, which in the figure is measured from a horizontal reference line (where θ=0°). Using the encoding described in the preceding paragraphs, and using the shape introduced in FIG. 11a, the examples in FIG. 11b show how various chromosomes, A, B, C, and D, map to actual piece placements in the Cartesian plane. In particular, A and B have the same orientation (75°) but different (x,y) coordinates. C and D have the same (x,y) location, (22.8, 11.6) but different orientations. B and C have the same y-coordinate and the same orientation, but C's location is shifted by 11.9 on the x-axis.

Description of Operation

Figure 14:
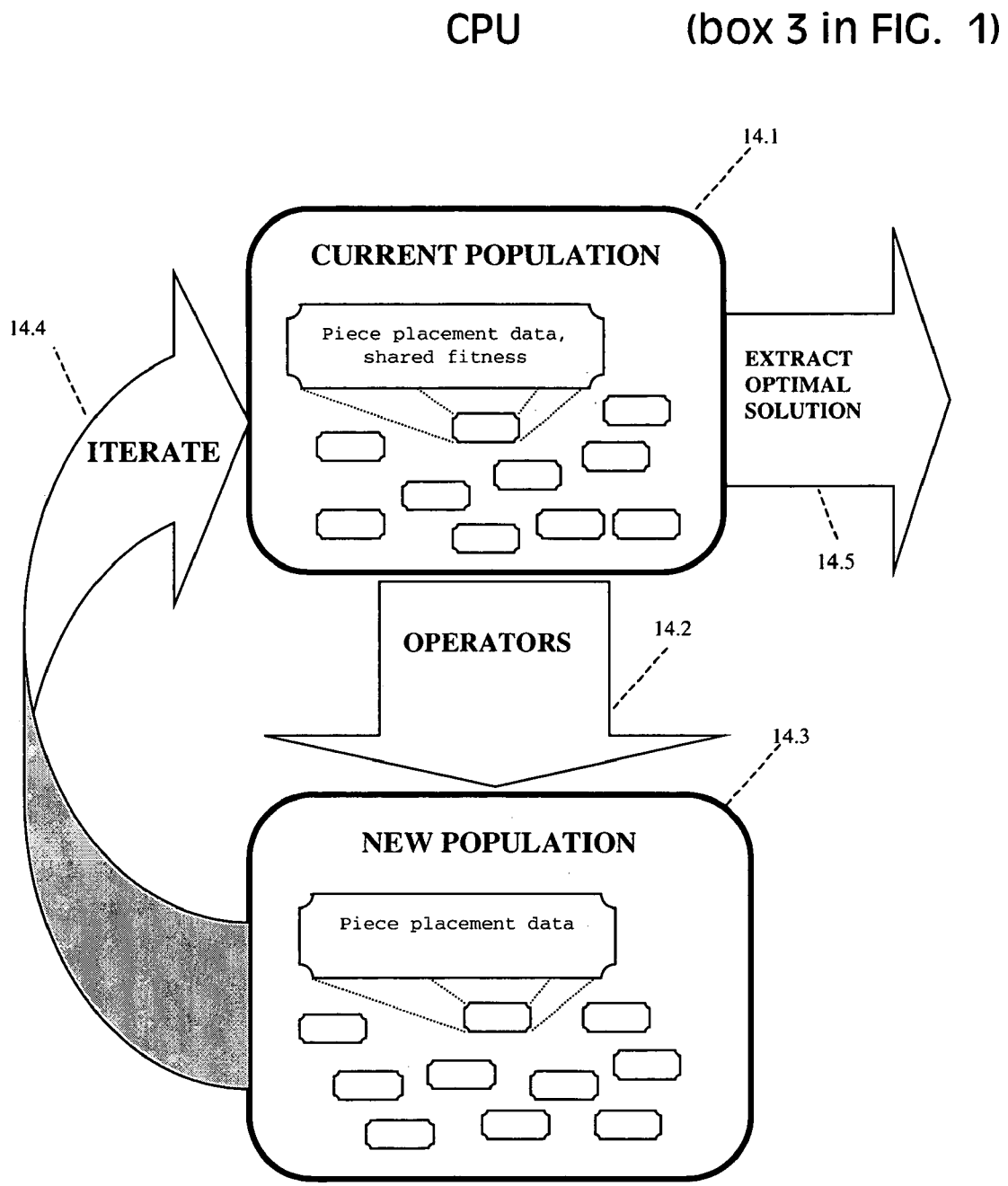
FIG. 14 is an overview of the key processing elements of the proposed invention.

General Algorithm (FIG. 14):

At the most general level of description, the algorithm that is being processed in the CPU (reference numeral 3) in FIG. 2 is shown in FIG. 14. Overall, what is happening is that the algorithm is maintaining a set (population) of chromosomes (individuals), each of which encodes the placement of a shaped piece. The population, reference numeral 14.1 in FIG. 14, is fixed in size (e.g., population size M=1000). But with each iteration the current population is changed through the use of operators such as genetic algorithm selection and reproduction, and/or genetic algorithm discovery operators (Horn, 2002) such as recombination (one example is "crossover") and mutation, and/or other operators, such as a local optimizer like hillclimbing (see definitions of terms).

The operators, reference numeral 14.2 in FIG. 14, produce new individuals (which are often partial or complete copies of individuals existing in the current population). The operators used can vary with the implementation, but the invented method requires that at least one of the operators applies selection pressure based on the shared fitness which is calculated, using Resource-defined Fitness Sharing (RFS) as introduced by Horn (2002) and described in FIG. 6, for each member of the current population. The selection (or reproduction) operator must be biased toward selecting and reproducing (i.e., copying) individuals with higher shared fitness. That is, the higher an individual's shared fitness, the more likely it is to be selected (for copying into the new population). The goal of selection is to reproduce the chromosomes with higher fitness, replacing those with low fitness. The goal of discovery operators is to create new chromosomes from old ones by making randomized changes to existing chromosomes.

The new individuals are placed in the new population. Once the new population is large enough, it replaces the current population (that is, the new population becomes the current population), and the iteration counter, if there is any, is incremented by one; see reference numeral 14.4 in FIG. 14. After some number of iterations, a process is invoked for extracting a solution from the current population, reference numeral 14.5 in FIG. 14.

Preferred Embodiment (A Genetic Algorithm, FIG. 3):

A version of the typical genetic algorithm (GA) is run, but in this case the individuals each represent a possible placement of a shaped piece on the substrate. Unlike a typical GA, the individuals in our population can interact with each other through the calculation of their shared fitnesses (they compete for space on the substrate). Individuals cooperate with each other indirectly (by not competing with each other, and by having mutual competitors). Thus two individuals cooperate if they do not compete for the same area of substrate; in other words, they cooperate by not overlapping.

The task of the GA operators over the generations of a run is to find and replicate those individuals that form the largest set of non-overlapping shaped pieces that can fit on the substrate. As these cooperating individuals are replicated (i.e., reproduced by the selection operator), there will be many copies of some individuals in the population. An entire set of duplicate individuals is considered to be a species. Over the multiple generations, the genetic discovery operators (e.g., crossover and mutation) add new species to the finite population, while selection using the computed shared fitness values promotes the most cooperative sets of species. The result is that the largest set of cooperative species (representing non-overlapping piece placements) will have the highest "species counts" (that is, number of copies of individuals of a species). Looking only at the highest count species, the system can extract the largest set of cooperative species from the last population (final generation).

Figure 3:
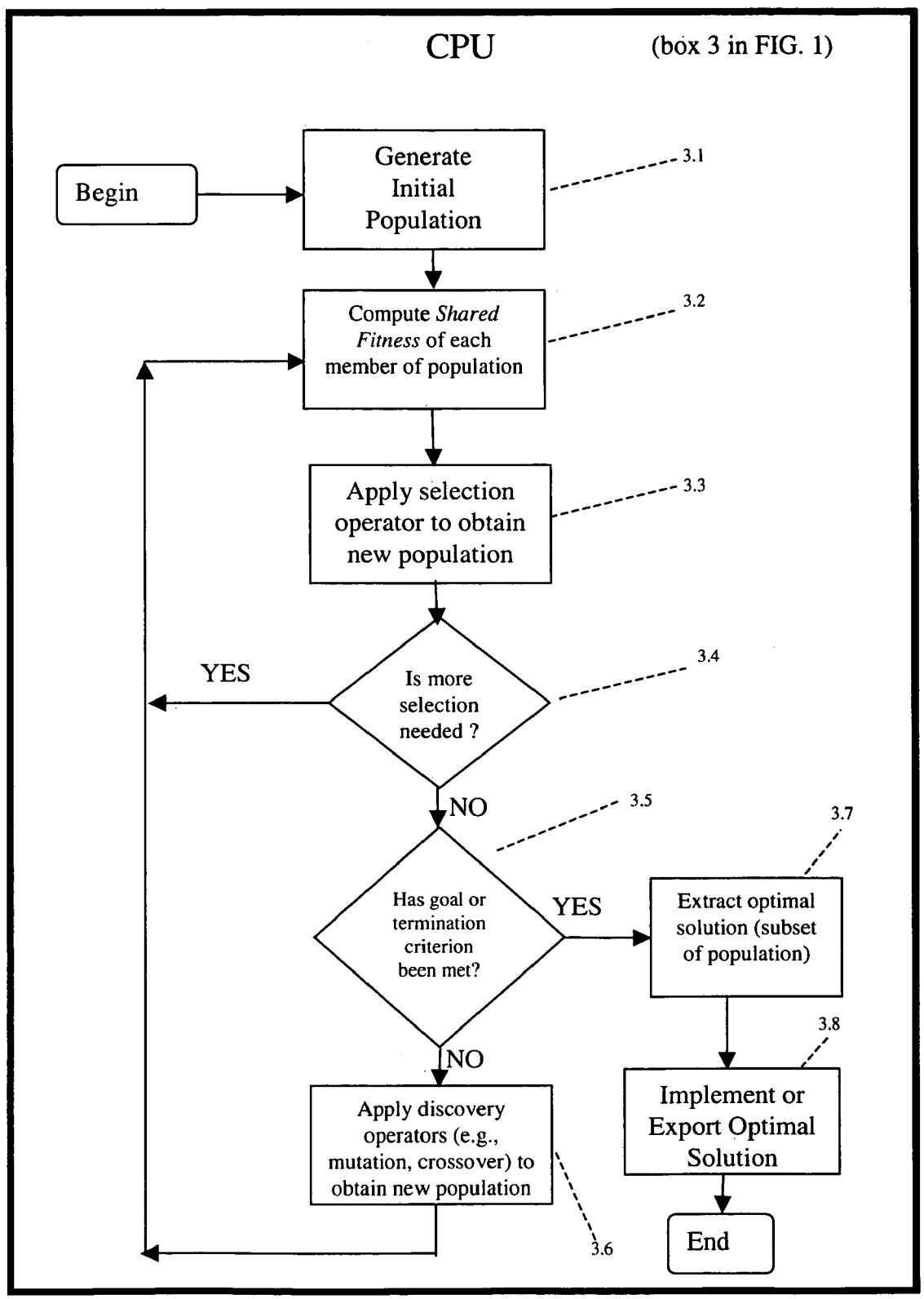
FIG. 3 is a flow chart depicting the major software components of one possible embodiment of the invention, and how those components work together, functioning on the CPU component of FIG. 2 and FIG. 1.

High-Level View of Genetic Algorithm Embodiment of Invention—FIG. 3:

FIG. 3 shows the high-level parts of a particular GA that is one possible embodiment of the invention. It corresponds to the software process running on the CPU (or multiple CPUs), which is component 3 in FIG. 2. The GA in FIG. 3 is also the preferred embodiment of the population-based, iterative process in FIG. 14. Below the blocks of FIG. 3 are described.

3.1 Generate Initial Population (Block 3.1 in FIG. 3):

An initial population of chromosomes is created. Typically in a genetic algorithm the initial population is generated completely or partially "at random". In some cases, genetic algorithm implementers choose to "seed" a portion of the initial population with known good solutions, while using random chromosomes for the rest of the population. The purpose is to set up the population before entering the "generation loop" (beginning with block 3.2 below), which then generates successive generations (i.e., populations) from previous generations. The initial generation is usually numbered "0", thus it is known as "generation 0". The population size is a number M, typically fixed at the start of a run. Typical population sizes vary from M=50 to M=50,000 or more. It is important to the present invention that the population be adequately sized to allow an optimal solution to be represented. Thus the problem at hand can help guide the sizing of the population: given the geometry of the substrate and of the shaped piece, the size of the optimal solution can be bounded. That is, by dividing the size (e.g., area) of the substrate by the size of the piece, an upper bound on the number of species in an optimal solution is obtained. The population size M should be set much larger than this (that is, M>>solution_size), recognizing that each member (species) of the optimal solution will have to have many copies in the final population, and that additional population capacity above and beyond this is needed to allow for continuing exploration.

3.2 Compute Shared Fitness of Each Member of the Population (Block 3.2 in FIG. 3):

Every individual (member) of the current population is evaluated and assigned a "fitness" (i.e., figure of merit). In genetic algorithms in general, this fitness measure is a scalar value, typically a non-negative real number. This fitness value is needed for the processing in block 3.3, which involves selecting the individuals (chromosomes) with higher fitness values. It is therefore important to compute and assign a fitness value to every member of the current population.

In this invention, the "shared" fitness is calculated for each individual, and is used in selection (block 3.3). The shared fitness is computed based on the piece placement (that is, location and orientation of the piece on the substrate), which is encoded in the chromosome. Although computed separately for each member of the population, shared fitness is also based on (that is, it is a function of) all members of the current population. The presence of other individuals in the population can affect the fitness of a particular individual. Details of the shared fitness calculation are shown in more detail in FIG. 6 and explained later. In general, the shared fitness function takes the form of a fraction, in which the numerator is a function of the area covered by the piece, and the denominator is a function of how much the piece overlaps with other pieces (individuals) in the population. Also, individual pieces whose placements cause them to extend beyond the boundaries of the substrate are given a low shared fitness (lower than that of pieces whose placements put them entirely on the substrate). For example, in FIG. 11*c*, individuals A, B, C, and D would be a given a lower shared fitness than that of E.

3.3 Apply Selection (Block 3.3 in FIG. 3):

In this block the current population is subjected GA selection. A selection operator is applied in order to create more copies of better fit individuals while removing copies of lesser fit individuals. While GA selection methods are randomized processes, they are biased toward replicating better fit individuals at the expense of lesser fit individuals. There are many GA selection methods in the literature. One common class of selection methods is known as "generational selection" in which the entire current population is replaced by a new population, of exactly the same size M (i.e., number of individuals).

The new population will be made up solely of copies of individuals from the current population (i.e., no new individuals are created in this step; that is the job of the discovery operators in Block 3.6). But the new population will be different in the numbers of those copies. Because selection is biased toward selecting and making copies of (i.e., reproducing) the better fit individuals, it is likely that the new population will have more copies of the highest fitness individuals from the current population and fewer (or no) copies of the lowest fit individuals in the current population. In essence, new copies of better fit individuals will replace old copies of less fit individuals.

There are a number of well-known selection methods in genetic algorithms that can do this. All are randomized somewhat, and so are non-deterministic (that is to say they are probabilistic). Many of these selection methods, such as proportionate selection, which includes "roulette wheel" selection, will work in an implementation of this invention. Whatever selection method is used, it is important that the method has an "intermediate selection pressure", which means that the method has some (non-zero) selection pressure, and hence has some bias toward reproducing better fit individuals, but not an extreme degree of selection pressure (e.g., replicate only the highest fitness individual and immediately fill the population with M copies of it). Too little selection pressure leads to "genetic drift", with little or no improvements to the average fitness of the population, while too much selection pressure leads to "premature convergence" and loss of genetic diversity. The sensitivity of GA performance to selection pressure is a well-known phenomenon in the field.

3.4 DECIDE: Is More Selection Needed? (Block 3.4 in FIG. 3):

This is a decision block. It is also optional. The selection operation (Block 3.3) can be applied to the current population several times, and thus be more likely to get rid of lower quality (i.e., lower fitness) individuals. Applying the selection process multiple times, before checking for termination (in block 3.5) or proceeding to the application of genetic discovery operators (block 3.6), is known to have the effect of increasing selection pressure. This effect might be desirable.

An additional consideration here is the known tendency of sharing methods in GAs (e.g., fitness sharing (Goldberg et al., 1987), resource sharing (Horn, 1997), and the present invention, RFS) to converge on an equilibrium population distribution, consisting of diverse, high-quality individuals grouped into sets of identical, or near-identical copies (considered "species"). In contrast, a GA without sharing or other diversity-maintenance operator, tends to converge to a uniform population consisting of a single species (that is, M copies of the best individual found). The equilibrium distribution of the population, achieved by GAs with sharing methods, is known to have some unique and desirable properties (Horn, 1997). It might be desirable then to apply the selection process of block 3.3 to the current population multiple times until it is detected that equilibrium is reached, before further processing of the population (e.g., application of discovery operators).

Thus the decision criteria for this step could include (1) "has the selection operator been applied t times yet?" (where t is a number fixed at run time, perhaps chosen by the GA implementor), and/or (2) "has the population converged sufficiently close to an equilibrium distribution?" (as measured, for example, by how little the population distribution changed with the last application of selection), and/or other such criteria.

It is common for the selection process to be applied only once per generation. Thus this block (3.4) could be effectively skipped (i.e., the answer to the decision query is always "No").

Figure 15:
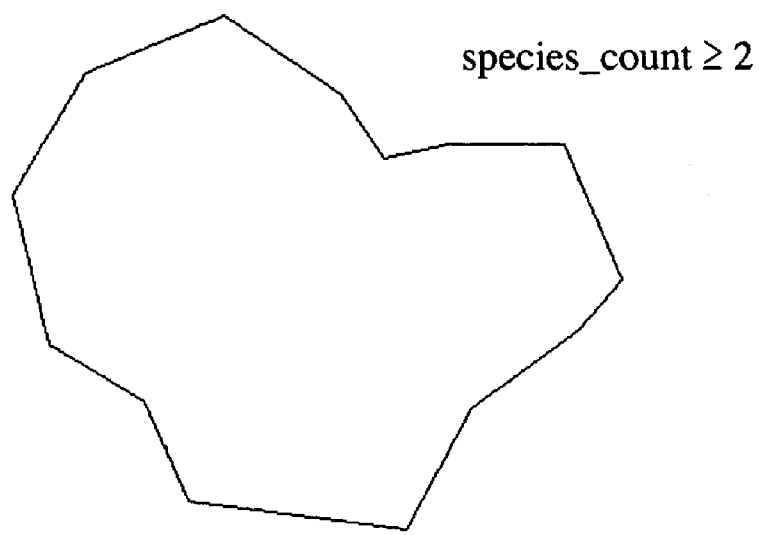
FIG. 15 shows Generation 0 at the beginning of an actual run of a GA implementing the present invention.
Figure 15:
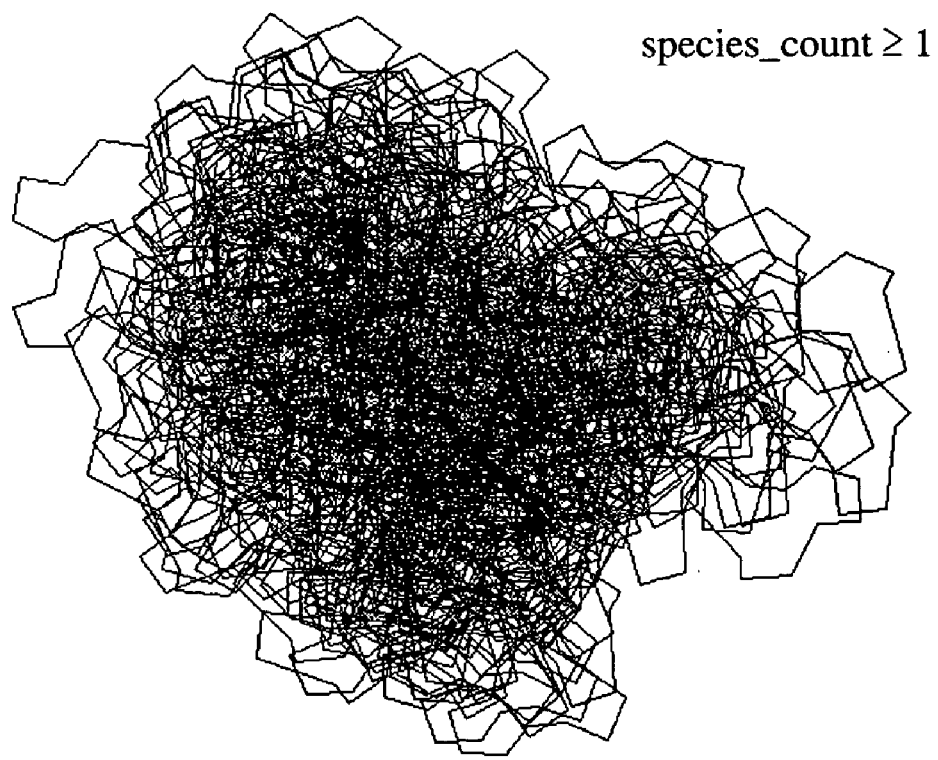
Figure 16:
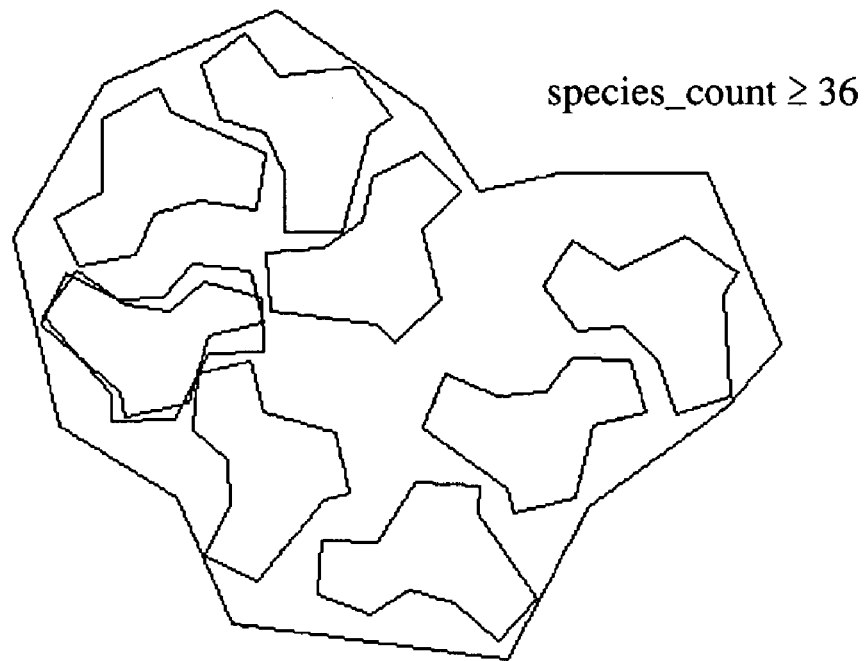
FIG. 16 shows Generation 209 from an actual run of a GA implementing the invention.
Figure 16:
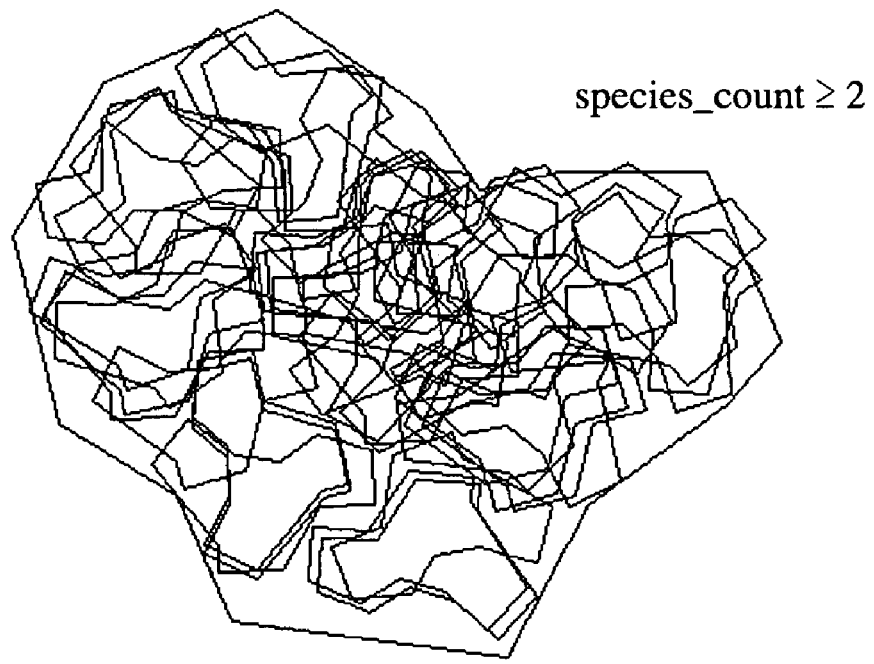
Figure 17:
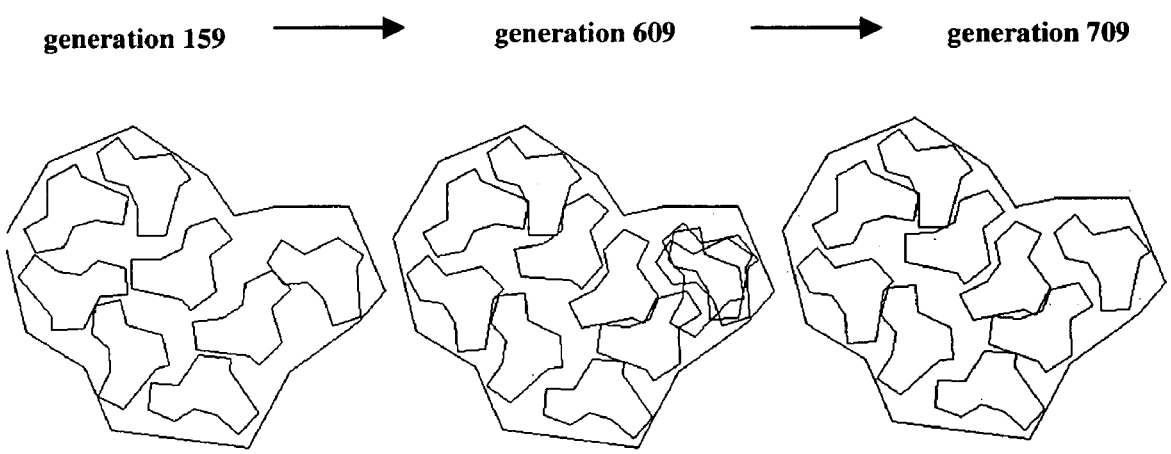
FIG. 17 shows the population at Generations 159, 609, and 709 of an actual run of a GA.

3.5 DECIDE: Are Termination Criteria Met? (Block 3.5 in FIG. 3):

The run of the algorithm can be terminated for multiple reasons. Typically there will be one or more "termination criteria". For example: (1) the system has found a reasonable, good enough solution to the problem, and/or (2) the system seems be making little or no progress in improving the quality of the population over the last few generations, and/or (3) the system has reached some other constraint, such as running out of time or computer memory. For example, in the runs described in (Horn, 2002) the population of each generation is displayed on screen (reference numeral 9, the Display, in FIG. 2), depicting how it would solve the nesting problem. FIGS. 15, 16, and 17 provide an example of this kind of on-line visualization capability. The images in FIGS. 15, 16, and 17 were taken from screen shots of a running GA that implements the invention. The plot for generation 159, on the left of FIG. 17, show a nesting with eight pieces. By generation 709, shown at the right side of FIG. 17, a ninth piece has been added. This nesting appears to be optimal, with nine pieces nested on the substrate with no overlap. By visual inspection, it seems unlikely that a tenth piece could be placed. Or it might simply be the case that the user, seeing that it took several hundred generations to improve the solution from eight to nine pieces, might be unwilling to wait for an unlikely additional improvement. The user is able to stop the run, or have it continue with more generations, through the use of a computer keyboard and mouse (reference numeral 8, Input Devices, in FIG. 2).

Horn (2002), after watching many runs of the RFS algorithm on a particular instance of a shape nesting problem, determined that a certain number of generations (i.e., iterations of the main loop in the flowchart of FIG. 3) would be sufficient for the appearance of the best solution a particular run would ever produce. In the example runs in (Horn, 2002), this number was usually several hundred (from 200 to 1200 generations).

In some runs, it might also be clear that a true, global optimum has been found: if the current population contains a solution with P pieces, whose summed area is so close to the area of the substrate that it would be impossible to place another piece (i.e., substrate_area−(P*piece_area) <piece_area). Thus there are a number of ways and means to decide when to "end" the main loop (e.g., fix a number of generations ahead of run time, or by visual inspection of each generation's population, etc.).

In a most general sense, termination may be considered optional in that one may examine multiple populations for optimal solutions while the algorithm continues to run, and may extract an optimal solution from a current or earlier population for use with or without stopping the algorithm. Alternatively, termination may be considered to have happened when in fact an acceptable solution has been extracted, whether or not the algorithm is stopped.

3.6 Apply Discovery Operators (Block 3.6 in FIG. 3):

If continuing with the main loop of the current run, generate a new population from the current one by applying any of the typical GA discovery operators, possibly tailored to the problem at hand. Discovery operators such as mutation and crossover create new variants on existing chromosomes in the current population. For example, in (Horn, 2002) a type of the known Gaussian mutation operator is applied to the x and y coordinates of a chromosome. This means a randomly generated (with Guassian distribution) value is added or subtracted from each coordinate.

Figure 13A:
FIG. 13 illustrates one type of mutation operator, in which a single gene is chosen in a single individual (the "parent") to be modified slightly in the single "offspring", which is otherwise a copy of the parent.
Figure 13B:
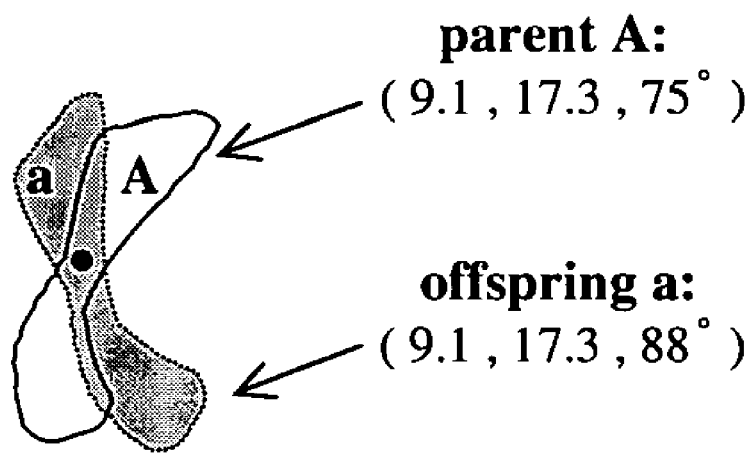

FIG. 13 shows one possible mutation operator operating on a single individual, parent A, to produce a single modified individual offspring a. In this example, the chromosome encodes the three placement values as a string composed of an x-coordinate, a y-coordinate, and an angle of rotation. FIG. 13 shows the mutation operator changing one of these values on the chromosome, the angle of rotation, in producing the offspring a. The other, non-mutated, values are copied directly from A to a. FIG. 13b compares the placement of the parent to the placement of the offspring. The slight change to A's orientation on the substrate can be seen.

Figure 12A:
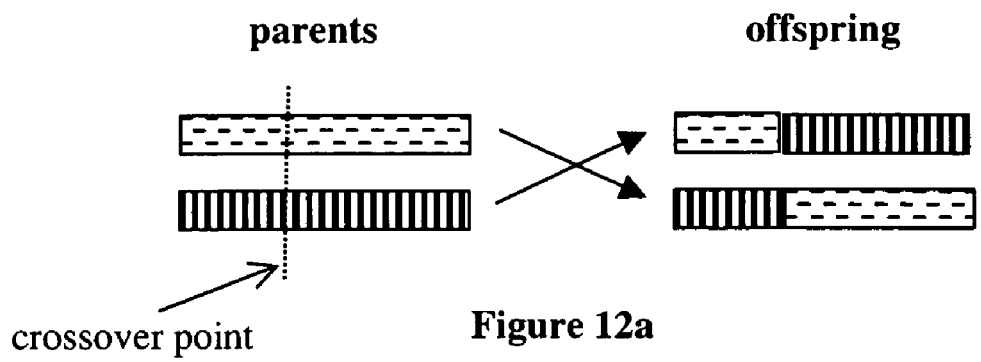
FIG. 12 illustrates one well-known type of GA recombination operator (one-point crossover) and shows its effect on two members of the population chosen for recombination, in one possible implementation of a preferred embodiment of the current invention.
Figure 12B:
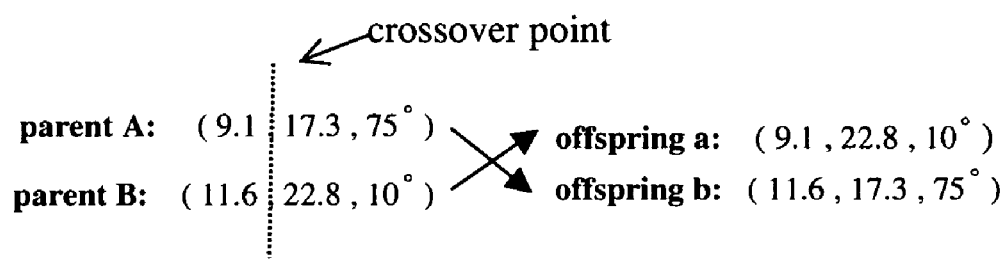
Figure 12C:
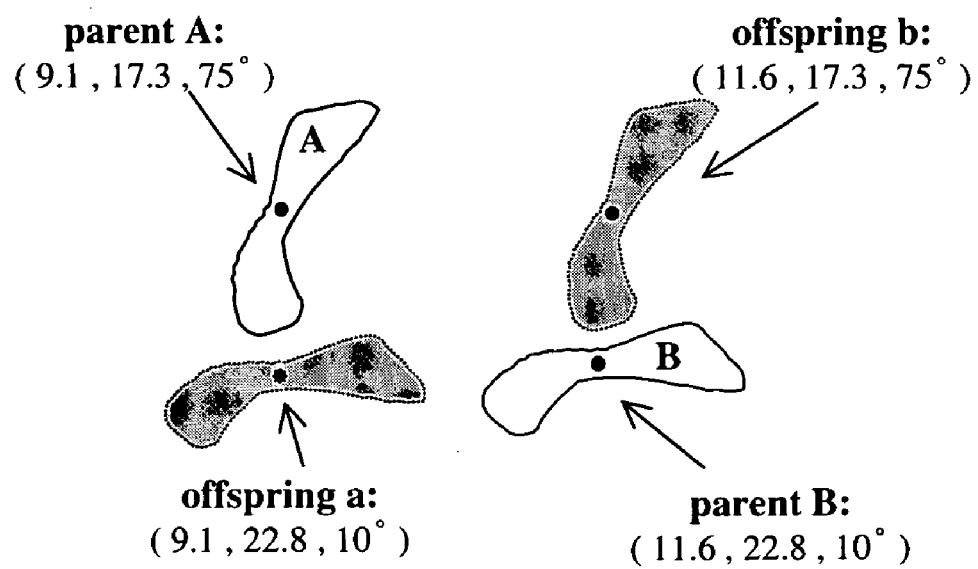

Another possible discovery operator is crossover. An example of one type of crossover is shown in FIG. 12: one-point crossover operating on a pair of "parent" chromosomes to produce two "offspring" chromosomes, each combining genetic material from both parents. FIG. 12a shows a schematic overview of one-point crossover operating on a pair of linear (i.e., string) chromosomes. A location is chosen (typically at random) along the chromosome, and becomes the crossing point. Genetic material (i.e., alleles) on one side of the crossing point are taken from one parent, while material on the other side of the crossing point is taken from the other parent, to produce an offspring. A second offspring is created by reversing the roles of the two parents. FIG. 12b illustrates the one-point crossover using chromosomes that encode a 2-dimensional shape nesting problem. The crossing point is chosen (at random) to be between the gene specifying the y-coordinate and the gene specifying the angle of rotation. Therefore, in effect, crossover will exchange the angle of rotation between the two parents A and B to create two new individuals, offspring a and b. FIG. 12b shows the exchange of alleles (that is, the actual numeric values for the x and y coordinates and the angle of rotation). FIG. 12c views the parents and the offspring pictorially, illustrating their placements on the substrate.

These discovery operators can be applied probabilistically. For example, a parameter such as $p_c$ (between 0 and 1, and often set to 0.6) is often used as the probability that crossover is actually applied to a particular pair of chromosomes (thus with probability $1-p_c$ a pair of chromosomes chosen for parents are NOT crossed, and are instead copied directly into their offspring). These parameters allow the GA practitioners to experiment with different degrees of "exploration pressure". It has been found that in general the best search performance for GAs is achieved when intermediate probabilities of discovery operator application are used. In other words, some crossover and some mutation is better than none, but too much crossover or too much mutation can disrupt and destroy highly fit individuals and lead to poor GA performance.

The result of applying discovery operators to the current population is a new population of chromosomes that are the "offspring" (e.g., crossed and mutated variants) of the parent (current) population. The current population is replaced with the new one, which then becomes the "current population".

Processing proceeds through another iteration of the main loop by returning to block 3.2 above.

3.7 Extract Optimal Solution (Block 3.7 in FIG. 3):

Once it is decided to end the current run of the algorithm (in block 3.5 above), the system can extract the subset of the final population that represents the solution to the shape nesting problem. This will be a set of non-overlapping species (defined above).

There are several ways to determine this subset. For example, in several of the runs in (Horn, 2002), there is a single perfect nesting in which the substrate is completely covered by non-overlapping species of shaped pieces, and nothing is "wasted". Clearly these situations represent optimal solutions. Furthermore, in most runs that give such distributions, the entire final population is distributed among the "ideal locations". But this is not always the case. If the final population contains some overlapping species, then there will be multiple subsets of non-overlapping species that can be culled from the population. One way to do this would be to successively eliminate species from the population, starting with those with the lowest species counts $n_x$, and working up to higher-count species, stopping as soon as there are no overlaps among the remaining species.

Alternatively, one can start with the highest-count species (i.e., the ones with the most copies), adding them to the "solution set", and go down the list of species adding increasingly lower-count species to the solution set as long as they do not overlap with any species already in the solution set, until there are no more species left to consider. In this way, the solution set will contain a non-overlapping subset of species from the final population.

Another possible method of extracting an optimal solution subset of the final population is to allow the user to do so visually and interactively. For example, FIG. 16 shows screenshots of an interactive, graphical user interface that allows the user of one implementation of the current invention to control which species are displayed on the computer screen (reference numeral 9 in FIG. 2). By varying the "threshold species_count" (from 0 to population size M), via a computer mouse and keyboard (reference numeral 8 in FIG. 2), the user can specify that only those species with species count greater than or equal to the threshold are displayed. By gradually increasing the threshold while viewing the species in the final population, the user can focus on the most populous species. This will gradually remove from view the less populous species, which are more likely to be overlapping with other species. Eventually, with a high enough species count threshold, the user will see only non-overlapping species, as in FIG. 17, generation 709, in which a threshold setting of 22 yields a non-overlapping set of species. In this way, or using similar visualization controls, the user can interactively find and select the optimal solution set of species.

Other, similar methods could be used to extract such a solution set. This extracted solution set yields a list of placements for shaped pieces on the substrate and represents a solution to the shape nesting problem at hand.

Detailed View of Software Process—FIGS. 4, 5, 6, 7, 8, and 9

This section refers to FIGS. 5, 6, 7, 8, and 9, as well as FIG. 3 and FIG. 4, because FIGS. 5, 6, 7, 8, and 9 all provide further details of the major steps shown in FIG. 3. Each of FIGS. 5, 6, 7, 8, and 9 breaks down a block in FIG. 3 into more detailed steps, thus together representing a lower level of detail of the overall example implementation in FIG. 3.

3.1 Generate Initial Population (FIG. 5, which is block 3.1 in FIG. 3):

One common way to create an initial population of chromosomes is to generate them at random. That is, some or all of the chromosomes are determined by some randomization process that sets each of their alleles (i.e., gene values) to a random value within the pre-specified range of values. So for example, if the first gene on the chromosome represents the x-position of the piece, and the range for the x value is 0 to 120, then a random x value can be generated by choosing a random number between 0 and 120, and assigning that value to the first gene on the chromosome.

As a more complete example, suppose the population size is M and the encoding is (x, y,Θ), where x,y are Cartesian coordinates and Θ is the angle of rotation in degrees, then the following method could initialize a population (the initial population is known as "generation 0"):

```
Set current-population-size to 0
While (current-population-size < N),
    {
        generate a random value for x, between x_min and x_max
        generate a random value for y, between y_min and y_max
        generate a random value for Θ, between Θ_min and Θ_max
        add the new chromosome, (x, y, Θ), to the population
        increment the current-population-size
    }
```

At the end of this process the system will have produced an initial, randomized population of chromosomes.

Figure 5:
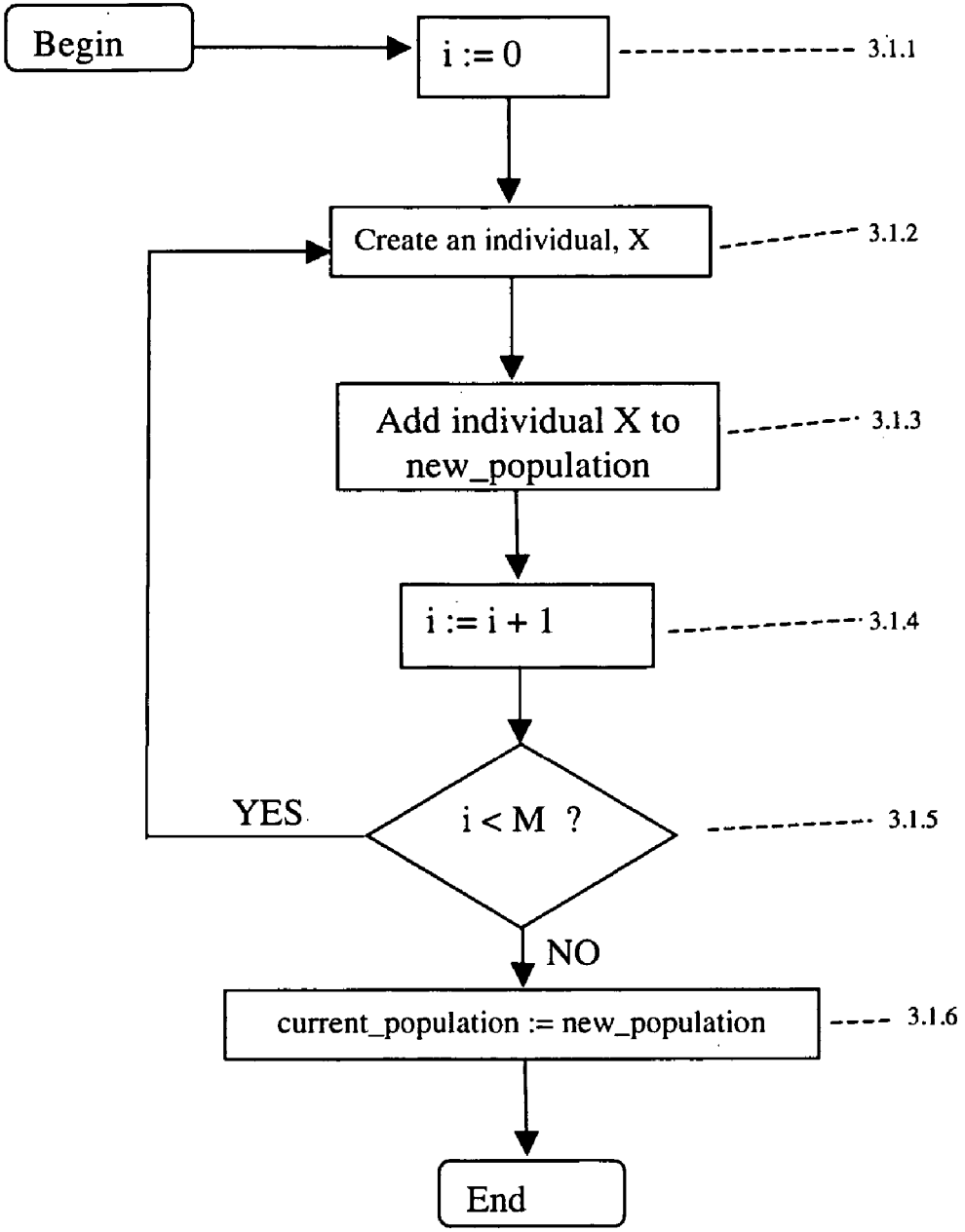
FIG. 5 is a flow chart showing one possible implementation of software component 3.1, "Generate Initial Population", from FIG. 3.

The overall process for this one possible implementation of generating an initial population is shown in FIG. 5. In block 3.1.1 or FIG. 5, an integer counter, i, is initialized to 0. In block 3.1.2, a single individual is created. This individual can be created in a number of ways. Typically, the individual is created by generating random values (i.e., alleles) for each gene in the chromosome. In the example above, this could mean generating a random x value for the x-coordinate of the shaped piece by choosing, through some randomized process, a numerical value between the known minimum x value ($x_{min}$) and the known maximum value for the x-coordinate ($x_{min}$), and similarly a random y value for the y-coordinate. Also, a random value for the rotation angle (θ) would be generated as well (e.g., $0 < \theta \leq 360$ degrees).

(It should be noted here that non-random individuals can be "created" at this block as well. It is quite common in GA implementations to put several copies of known, high-quality solutions, or otherwise "interesting" solutions, into the initial population. However, most GA applications involve a mostly, or at least partly, randomized initial population.)

In block 3.1.2 in FIG. 5, the newly created individual is added to the population (here designated "new_population"; this is typically implemented as a data structure such as an array, set, or list of individuals, with new_population thus being a new instance, or copy, of that data structure). In the next step, 3.1.4, the counter i is incremented to keep track of the number of individuals created and added to new_population. In block 3.15, a decision point is reached, and the method checks to see if the counter i is equal to the (fixed) population size M. If i is less than M, then not enough individuals have been created, and so processing returns to block 3.1.2 to continue creating and adding individuals. If at block 3.1.5 it is determined that i is not less than M, then it must be the case that new_population is full, that is there are M copies of newly-created individuals, and processing can proceed to block 3.2 (in FIG. 3). At this point, the new_population is assigned to current_population. (This assignment could be done in many different ways depending on the programmer's implementation choices. The important end result is that there is now an initial population in current_Population ready for processing in block 3.2 of FIG. 3).

3.2 Compute Shared Fitness of Each Member of Population (FIG. 6, which is Block 3.2 in FIG. 3):

In the present invention, the shared fitness for each individual is a function of the area of the individual piece, its placement on the substrate, and the extent to which the placed piece overlaps with other placed pieces (as represented by other individuals in the population). Thus it is necessary for the method of this invention to calculate the area of the individual piece, obtain the placement of the piece (by decoding the placement values from the individual's chromosome), and determining the areas of overlap between the individual piece and all pieces represented in the population, including itself. The details of the shared fitness computation are shown below.

In this major block (block 3.2 of FIG. 3), it is necessary to know how to place each piece (represented by each individual) in the current population. Thus it is necessary to decode the chromosomes to obtain the placement values (e.g., x,y coordinates and angle of rotation). Depending on how the decision (placement) variables are encoded (e.g., as floating point numbers, as binary (bit) strings, etc.), the decoding process might involve significant computation, and hence it might be desirable to only decode once. Thus for each individual, every time the chromosome is changed (e.g., by mutation), it is decoded and the resulting placement values are stored somewhere for use in fitness computation or other calculation (e.g., run statistics). An alternative approach to this "one-time decoding" is to simply decode the chromosome whenever the placement information is needed, even if this results in multiple decodings of the exact same chromosome. The current invention applies to any method of decoding. What is essential to this block in the invention is that the placement information can be extracted from the chromosome somehow, and is available as needed in the processing described next.

Using the decoded values of the chromosome, each individual's shared fitness can be calculated as follows. The general form of the shared fitness $f_{sh,k}$ calculation is that of a fraction:

$$f_{Sh,k} = \frac{f_k}{\text{niche\_count}(k, \text{population})}$$

In this fraction, the numerator $f_x$ is a direct function of the "objective" fitness of the particular individual k being evaluated, and the denominator niche_count (k, population) is the "niche count" for that individual in the current population. The niche count is a sum of pair-wise interactions between the individual (being evaluated) and each of all the other individuals in the current population. Below is a described first the calculation of the numerator (block 3.2.2) and then that of the denominator (in steps 3.2.3 through 3.2.8).

Figure 6:
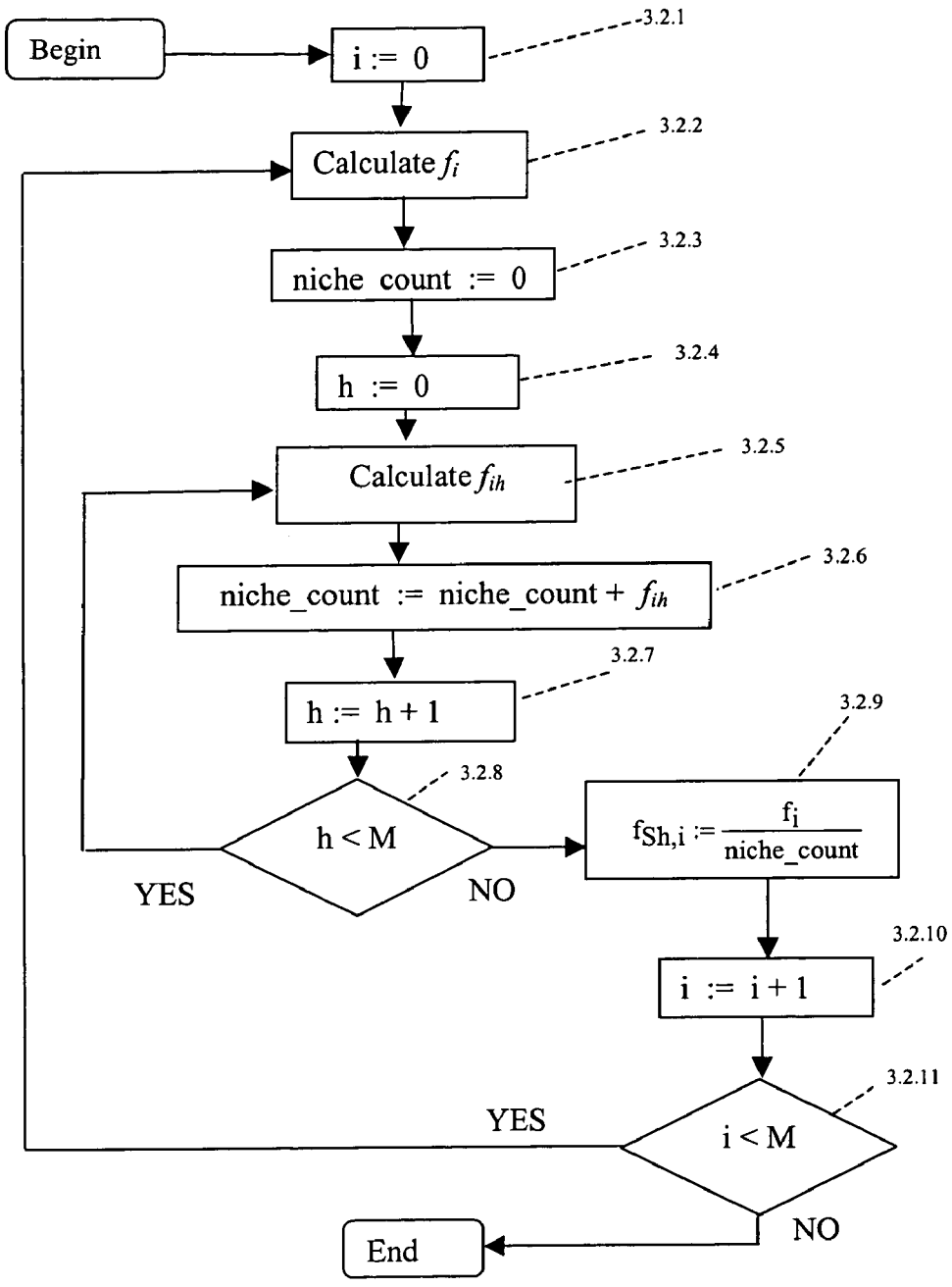
FIG. 6 is a flow chart showing one possible implementation of software component 3.2, "Compute Shared Fitness . . . ", from FIG. 3.

Steps 3.2.1 through 3.2.11 in FIG. 6 represent a loop that iterates over each member of the population. This loop is an "outer loop", as there is an "inner loop" that also operates over each member of the population. Together these two loops allow the comparison of each individual with each other individual, allowing the calculation of "pair-wise interactions" in the shared fitness calculation.

In block 3.2.1 in FIG. 6, the outer loop is begun by setting a counter variable, i to 0.

In block 3.2.2, the "objective fitness" of individual i, which is $f_i$, is obtained. This "objective" or "unshared" fitness is the numerator in the formula for calculating shared fitness. It is based on the actual, fixed area (call it $a_i$) of the shaped piece represented by that individual i. FIG. 4 illustrates the area quantities, $a_A$ and $a_B$, for two overlapping square pieces A and B. In (Horn, 2002), the area is used directly as the objective fitness: $f_i = a_i$. But this does not have to be the case. Since the shaped pieces are identical in shape and size, they all have the same area: $a_i = a_h$ for all individuals i and h. Since $a_i$ is a constant, any constant value could be used in the numerator. Thus, a possible function for the numerator would be $f_i = C$ for some constant C.

It is necessary to penalize (by lowering the fitness) those individuals whose chromosome-encoded placements violate the problem constraint that all placed pieces should be located entirely within the boundaries of the substrate. Thus if an individual specifies, through its placement values, that a piece be placed so as to extend beyond the boundaries of the substrate (and thus could not produce a complete shaped piece when cut), it must be given a low shared fitness value, lower than if it had NOT specified an "infeasible" placement of the piece. For example, in FIG. 11c, pieces A, B, C, and D, all should be penalized with lower objective fitnesses than those given to piece E (and to all of the other, unlabeled pieces shown). In FIG. 11c, pieces A, B, C, and D overhang the substrate boundary either partially (as with C and D) or completely (A and B). All of the other pieces shown are contained entirely on the substrate.

This penalty can be implemented in this block (3.2.2) by simply assigning a very low objective fitness $f_i$ to individual i, although there are other ways to implement the penalty. In (Horn, 2002) this penalty was implemented by simply setting the objective fitness to zero ($f_i = 0$) if individual i extends beyond the substrate boundary. More generally, any penalty method should work as long as it severely penalizes individuals that do not place their piece completely on the substrate. Thus any method such that $f_i << f_h$ (that is, $f_i$ is much, much less than $f_h$) if individual h fits entirely on the substrate while individual i does not, even if $a_i = a_h$, will work.

However $f_i$ is calculated, in block 3.2.2 it is obtained, to be later used (in block 3.2.9) as the numerator in the shared fitness formula above.

block 3.2.3 in FIG. 6 is the first block in the calculation of the denominator term in the shared fitness formula above. The term in the denominator is the "niche count", and it is a sum over all individuals in the current population. Block 3.2.3 initializes the accumulator variable niche_count to 0. Block 3.2.4 initializes the loop counter variable h to 0. Steps 3.2.5 through 3.2.8 implement the body of this inner loop, to accumulate the niche count for the current individual i.

Figure 4A:
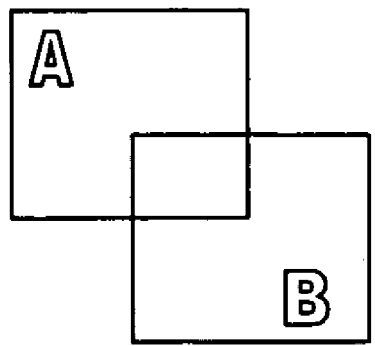
FIG. 4 illustrates some of the terms used in the description of the problem and the algorithm to solve the problem. Specifically, the concept of "overlap" of shaped pieces is shown, and the quantities used for shared fitness computation under RFS are qualitatively depicted.
Figure 4B:
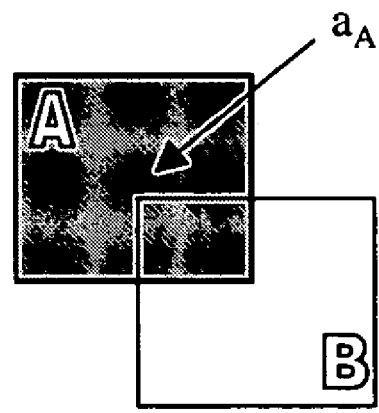
Figure 4C:
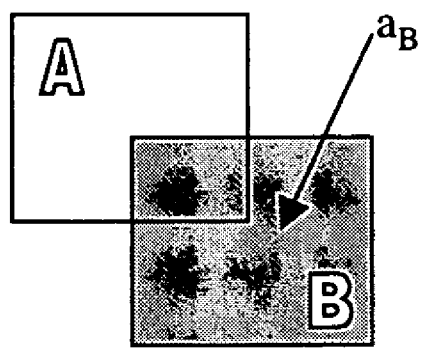
Figure 4D:
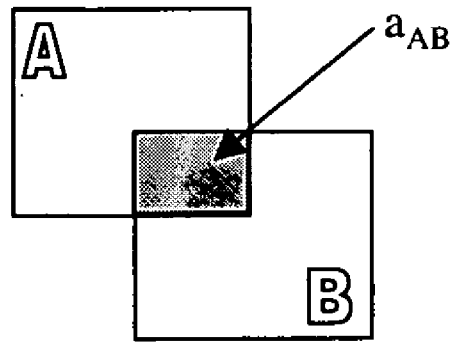

In the body of this inner loop, block 3.2.5 calculates the term $f_{ih}$ which is then added to the accumulating niche_count in block 3.2.6. After block 3.2.6, the inner loop counter h is incremented by one, in block 3.2.7, to advance the processing to the next individual in the population (so as to compare individual i to another individual in the population in the next iteration of the inner loop). The "pair-wise piece interaction" term $f_{ih}$ is a function of the area of overlap between pieces (specified by individuals) i and h. FIG. 4d illustrates the area of overlap, $a_{AB}$, between two square pieces, A and B.

In (Horn, 2002), the interaction term $f_{ih}$ is simply the area of overlap $a_{ih}$ between the two place pieces of individuals i and h: $f_{ih} = a_{ih}$. But more generally, $f_{ih}$ can be any monotonically increasing function of $a_{ih}$. Thus for example, $f_{ih} = (a_{ih})^4$ might have been used. It is essential that the greater the area of overlap between two individuals i and h, the greater the term $f_{ih}$ that is added to each of their niche counts. If there is no overlap between two individuals, $a_{ih} = 0$, the term $f_{ih}$ can be zero, so that there is no contribution to the niche count of individual i by individual h if i and h do not overlap. But if there is any overlap (i.e., $a_{ih} > 0$), then the term $f_{ih}$ should be greater than zero. In this way, the niche count can be assured to be greater than zero. (Note that because each individual i will be compared to itself (as both the inner and outer loops iterate over the entire population), the term $f_{ii}$ must be included in the niche count sum. Furthermore, $f_{ii}$ must be greater than zero because $a_{ii}>0$.) Thus division by zero is avoided, as the niche count will always be positive.

Block 3.2.8 compares the newly incremented loop counter h to the fixed population size M. Block 3.2.8 is a decision point. If h<M, then there are more individuals to be considered for the niche count of individual i. Processing then continues back at block 3.2.5, where the next individual h is considered for contribution to the niche count of i. If h is not less than M then the loop is completed and the niche count has been calculated over the entire population. Then in block 3.2.9 the objective fitness of individual i can be divided by its niche count, and the quotient assigned to the shared fitness of i: $f_{sh,i}$.

Next the loop counter i for the outer loop is incremented by one in block 3.2.10. In decision block 3.2.11, the newly value of i is compared to the fixed population size M. If i is less than M then there are more members of the population whose shared fitness needs to be calculated. Processing then proceeds back to block 3.2.2 to begin calculating the shared fitness for the next individual i in the population. If i is not less than M, in block 3.2.11, then i must equal M and the processing for high-level block 3.2 is done, having computed the shared fitness for each member of the population. Processing can then proceed to the next high-level block, 3.3, in FIG. 3.

It is important to note that the calculation of an individual's niche count can be computationally expensive, as it involves comparisons between all pairs of individuals in the current population, and the calculation of areas of overlap between arbitrary shapes. There exist many methods for speeding up these calculations, involving caching, estimating, or other mechanisms, some of which are listed in the section on "Computational Efficiencies". The use of such mechanisms in the general RFS approach is covered by the present invention.

Note that the shared fitness calculation discussed in this section is easily generalized to three dimensions by simply replacing the term "area" by "volume" in the discussion (and also adding three more decision variables to the encoding, matching the three additional degrees of freedom of three dimensions: z for height, and two more angles to cover pan, tilt, and roll).

Here is shown a more mathematical notation for the shared fitness formula, to further illustrate and clarify the calculation:

$$f_{Sh,i} = \frac{f_i}{\sum_{\forall h} f_{ih}}$$

$$f_{Sh,X} = \frac{f_X}{\sum_{\forall \text{species } Y} n_Y f_{XY}}.$$

The upper and lower equations above are equivalent. In the upper formulation, the summation in the niche count is taken over the population of individuals (using the variable h). In the lower formulation, the population is divided into species. Each species consists of the set of all individuals with the same chromosomes in the current population. Thus there is complete overlap between any two members of the same species, while there is less than complete overlap between any two members of different species. So in the lower formula, the summation is taking place over species. Thus it says that the shared fitness for any member of a species X is equal to the objective fitness of that species divided by the niche count for that species, which is computed as the sum over all species of the interaction term ($f_{XY}$) multiplied (weighted) by the number of members in that species (i.e., the "species count, $n_x$).

A concrete example, for the two overlapping niches A, B, in FIG. 4, would be:

$$f_{Sh,A} = \frac{f_A}{n_A f_A + n_B f_{AB}}.$$

After computing the shared fitness for each piece in the population, processing can continue with traditional GA operators, such as selection, and discovery operators.

Figure 7:
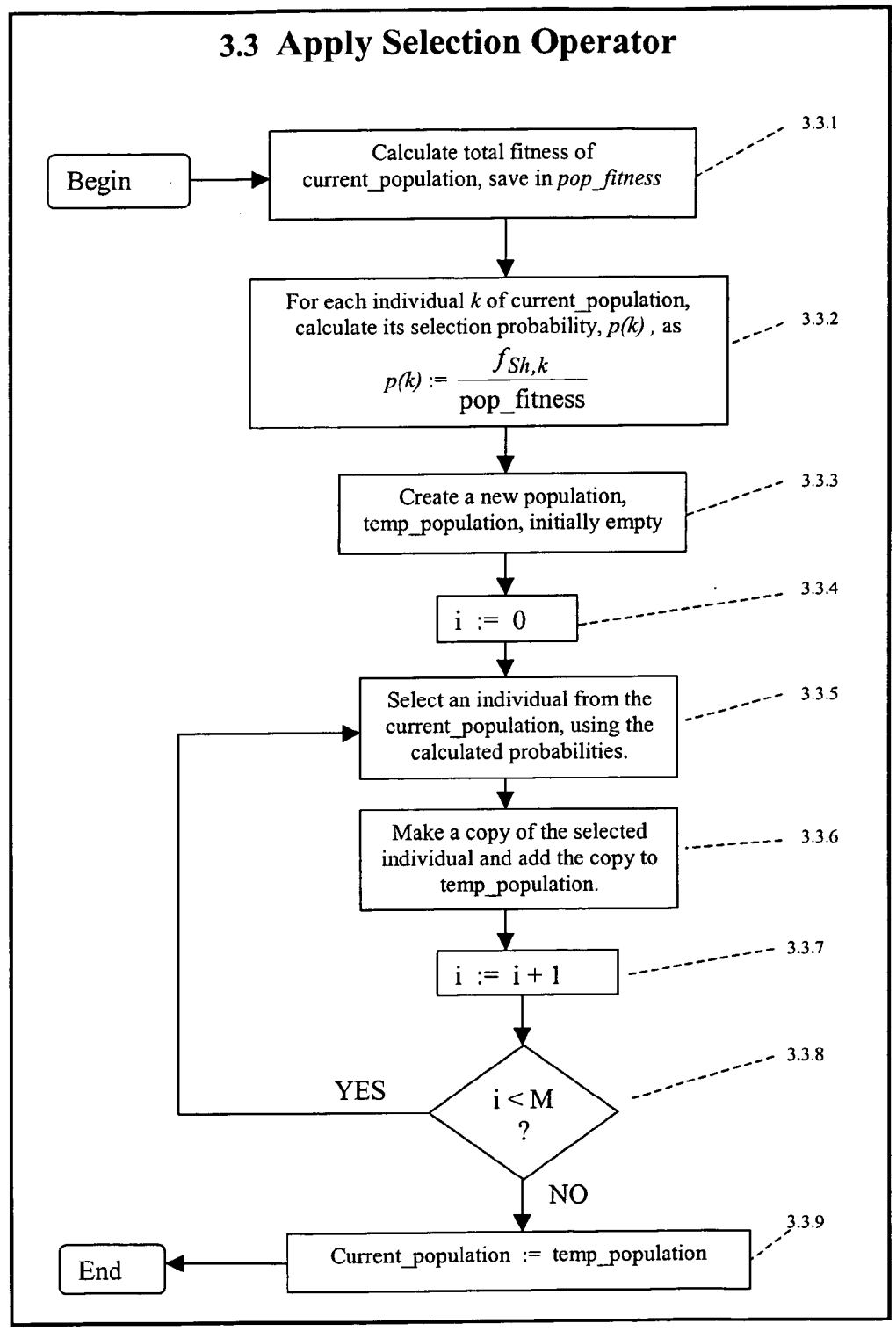
FIG. 7 is a flow chart showing one possible implementation of software component 3.3, "Apply Selection Operator", from FIG. 3.

3.3 Apply Selection Operator (FIG. 7, which is Block 3.3 in FIG. 3):

A GA selection method is now applied to the current population, using the recently calculated shared fitness values assigned to each individual in the current population. While many selection methods for GAs have been introduced over the years (e.g., tournament selection, truncation selection), a few have been shown to work especially well with shared fitnesses such as those computed by fitness sharing, resource sharing, or the current invention, RFS. In particular, roulette-wheel selection, a type of proportionate selection, is known to work well with GA sharing methods (Horn, 1997; "Niching Methods for Genetic Algorithms", Mahfoud, S. W., 1995 Ph.D. Thesis). In one preferred embodiment of the current invention, roulette-wheel selection is used as the selection method in block 3.3 of FIG. 3. In FIG. 7, the detailed processing of one possible implementation of roulette-wheel selection for the present invention is shown. (Another type of selection that may be used with the present invention is continuously-updated tournament selection.)

Roulette-wheel selection is a type of proportionate selection. Under any type of proportionate selection, the probability of an individual i being selected for copying (reproduction) is directly proportional to its fitness: the higher the fitness, the higher the probability of selection. For the current invention, the shared fitness of each individual in the current population, as computed in high-level block 3.2 of FIG. 3, is used to compute the probability of selection. Assuming the shared fitness of every member of the current population has been calculated, roulette-wheel selection proceeds as follows.

In the first processing block, 3.3.1, of FIG. 7, the shared fitnesses of the population are totaled (e.g., by a loop that goes through the current population and accumulates the shared fitness of each individual in a variable). This total is saved in a variable, such as pop_fitness.

In block 3.3.2, each individual k in the current population is assigned a probability of selection, p(k), that is directly proportional to its shared fitness, $f_{sh,k}$. By using the formula p(k)=$f_{sh,k}$/pop_fitness, roulette-wheel selection assigns each individual a probability between zero and one (recall that all shared fitnesses are non-negative), while assuring that the individual probabilities sum to one.

In block 3.3.3 a temporary population is created, initially empty. As individuals from the current population are selected for reproduction, they will be copied into temp_population, until temp_population is filled (i.e., it has M individuals). Before entering the loop comprised of processing blocks 3.3.5 through 3.3.8, a loop counter variable, i, is initialized to 0 (block 3.3.4).

Block 3.3.5 begins the loop that selects one individual per iteration from the current population and makes a copy for temp_population. Block 3.3.5 uses the computed individual probabilities (from block 3.3.2 processing) to select one individual. The name "roulette-wheel selection" refers to the metaphor of visualizing a roulette wheel divided by radial lines into sections of size (arc-length) proportional to the probabilities of the population (i.e., individual k would get a slice of the wheel that takes up p(k) of the total circumference), and then spinning the wheel and stopping it at a random point. That point will fall within the slot of a particular individual. That individual is selected. In this way, with each "spin" of the wheel, an individual k from current population is selected, and the probability of selection is p(k). There are many ways to implement the roulette-wheel metaphor in code, and many of these are published and well-known. For example, each individual k could be assigned an interval of length p(k) in the range (0 . . . 1). Then a random floating point number in the range (0 . . . 1) could be generated by a standard library random number function. Whichever individual's interval contains the generated number is selected.

In block 3.3.6, the selected individual is copied (i.e., a new individual is created and its chromosome is initialized to have the same alleles as the chromosome of the selected individual). The copy is added to temp_population. The loop counter (which also serves to indicate the current size of temp_population) is incremented by one in block 3.3.7. Block 3.3.8 is a decision block, in which the loop counter i is compared to the population size M. If i<M then temp_population is not yet full, and processing jumps back to block 3.3.5 to select another individual. If i is not less than M, then it must be equal to M, which means that temp_population is full and processing should proceed to block 3.3.9, in which temp_population is copied into current population.

After block 3.3.9, processing for high-level block 3.3 (in FIG. 3) is finished. Processing could then proceed to high-level block 3.4 in FIG. 3, "Is more selection needed?".

Figure 8:
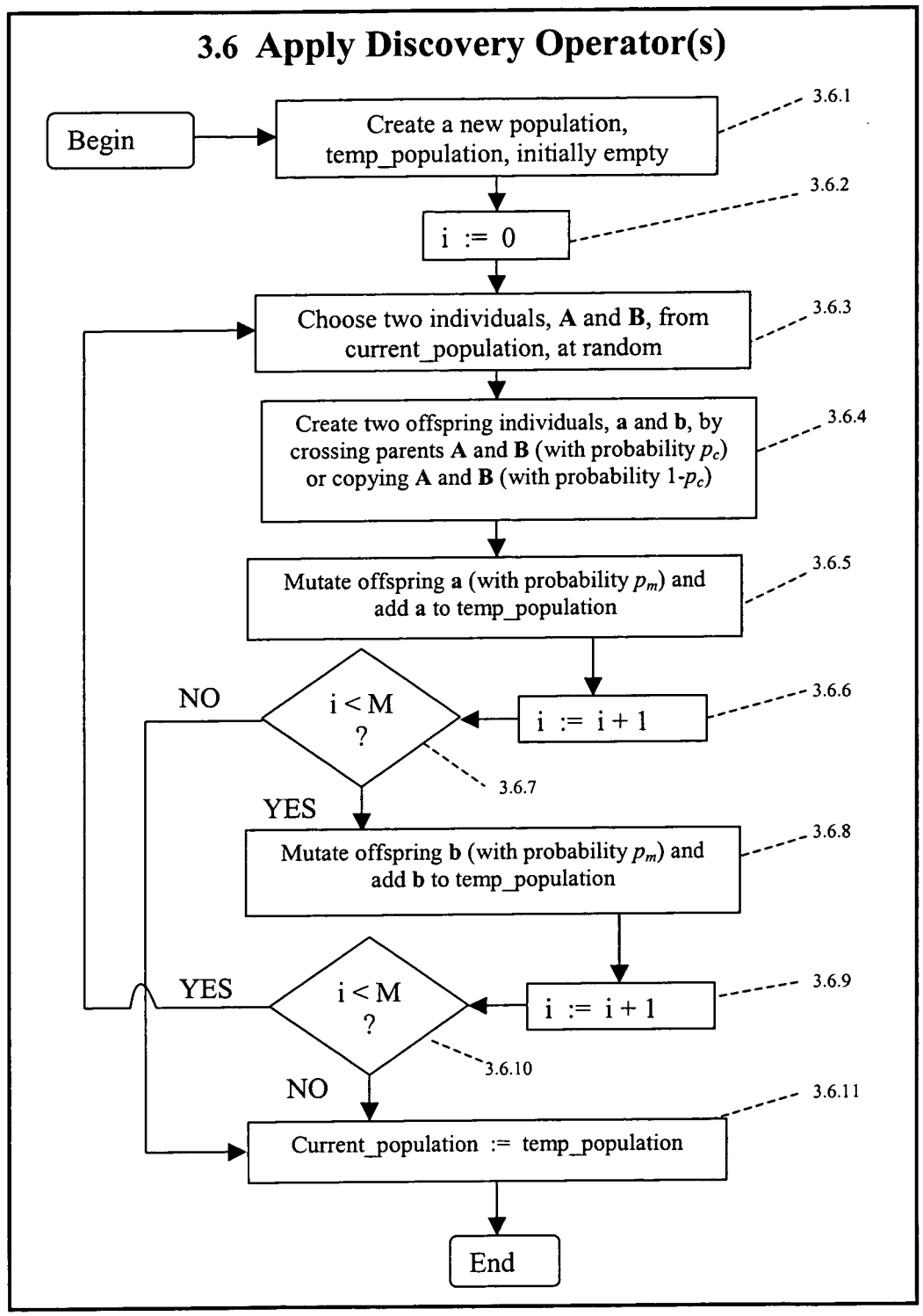
FIG. 8 is a flow chart showing one possible implementation of software component 3.6, "Apply Discover Operator(s)", from FIG. 3.

3.6 Apply Discovery Operator(s) (FIG. 8, which is Block 3.6 in FIG. 3):

Application of a discovery operator as shown in FIG. 3 is preferred, though optional. It has been found that simply repeating the computation of shared fitness and the selection process, subsequent populations will still tend to converge toward populations that include optimum solutions. If a discovery operator is to be applied, FIG. 8 shows the detailed processing for the high level block 3.6 in FIG. 3. A large number of possible discovery operators could be applied at this point in the processing. For the sake of illustration, two of the most common types of GA discovery operators, one point crossover and simple mutation, are used.

Processing begins with block 3.6.1 of FIG. 8. A new population structure, temp_population, is created, initially empty, in preparation for the creation of new individuals to be added to the temp_population. In block 3.6.2 the loop counter i is initialized to 0. The main population loop begins with block 3.6.3. In block 3.6.3 processing, two individuals A and B from the current population are chosen at random. In block 3.6.4, with fixed probability of crossover pc (where $0 \leq P_c \leq 1$), the two parent individuals are crossed (e.g., using one-point crossover, as illustrated in FIG. 12) to create two offspring a and b, combining traits (i.e., alleles) from both parents. If the parents are not crossed to produce the offspring (this happens with probability $1-P_c$), then the offspring will simply be direct copies of their parents. (i.e., offspring a will have a chromosome identical to that of its parent A). In practice, a typical range of values for the crossover probability $P_c$ is $0.5<p_c<1.0$. It is generally considered important to use some recombination such as crossover, but not too much.

Blocks 3.6.5 through 3.6.8 implement a mutation operator. Mutation is applied to both offspring (from crossover in block 3.6.4) a and b independently, again with a fixed probability $p_m$, (where $0 \leq p_m \leq 1$). If some randomization process in the processing of block 3.6.5 decides, with probability $p_m$, to perform a mutation on offspring a, one type of mutation picks one of the genes on the chromosome, at random, and changes the allele of that gene by a random amount, according to some probability distribution (e.g., the Gaussian mutation used in (Horn, 2002)). FIG. 13 illustrates a such a mutation operation. There are many possible variations on this type of single-gene mutation. There are also multiple gene mutation operators. Because mutation is considered to be a disruptive operator (it is as likely to alter a good gene value as it is a bad gene value), mutation rates are usually set quite low, in practice, so that a typical setting of $p_m$ is 0.005 (thus only about ½% of each generation is a result of a mutation).

Mutated or not, offspring a is added to temp_population in block 3.6.5, the loop counter variable i is incremented in block 3.6.6, and checked against the population size M in decision block 3.6.7. If i<M then processing passes to block 3.6.8, where the other offspring, b, undergoes the same mutation process that a underwent, after which the (possibly mutated) individual b is added to temp_population, the loop counter variable i is incremented (block 3.6.9) and checked against M again (block 3.6.10). If temp_population is still not full (i<M) then the processing returns to the top of the loop at block 3.6.3, to choose two more individuals at random from current population.

Whenever temp_population fills up with new individuals (when i=M) processing breaks out of the loop by going to block 3.6.11. The current population is replaced by the temp_population, and processing returns to high-level block 3.2 to have the new individuals in current population evaluated for shared fitness.

This section has just illustrated only one possible implementation of using discovery operators in the invention. There are many more such possibilities. In particular, there are many possible domain-specific discovery operators that might be applied. For example, for shape nesting it seems tempting to use some kind of "sliding movement" mutation operator, that modifies an individual by changing its x,y location coordinates in order to "push" the individual piece until it meets up with another piece in the population. In other words, move a piece (perhaps in some random direction) until the piece collides (that is, just barely begins to overlap) with some other piece in the population. Such a slide operator might allow denser packings of shapes. Whether or not such an experimental operator is successful, all such customized and tailored operators can be used easily within the current invention.

Figure 9:
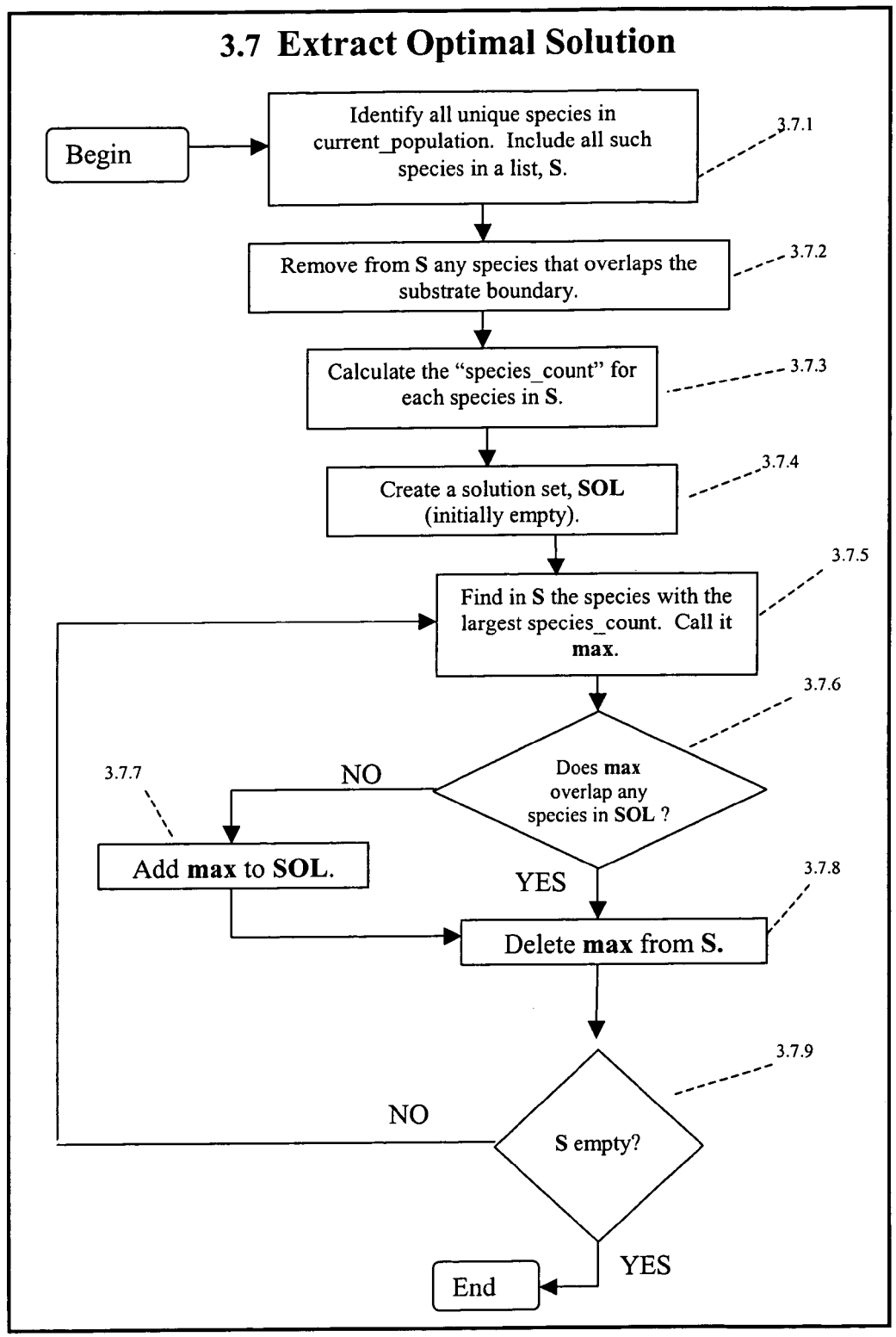
FIG. 9 is a flow chart showing one possible implementation of software component 3.7, "Extract Optimal Solution", from FIG. 3.

3.7 Extract Optimal Solution (FIG. 9, which is Block 3.7 in FIG. 3):

When it is decided (in high level decision block 3.5) that it is time to extract an optimal solution from the current population, there are many possible methods. Many involve looking at the species (unique chromosomes) in the current population, at the species counts, and at the overlap between species. Below, and in FIG. 9, is presented one possible implementation of this general process.

In block 3.7.1, the unique species present in the current population are determined by going through the current population, looking at each individual, keeping a list of species seen so far, and adding to it only when finding an individual in current population who does not match any of the species in the list so far. This will find all species in current population and store them in a list S.

Block 3.7.2 checks each species in S. Any species that is not entirely contained on the substrate is deleted from S. At the end of this processing, S contains only the feasible species.

In block 3.7.3 each species in S is assigned its own species_count, which is the number of copies (individuals) of that species contained in the current population.

In block 3.7.4 a data structure such as a list, array, or set, is created to hold the members of the solution set, SOL. It is initially empty.

Block 3.7.5 is the first block in the body of the loop. Processing in block 3.7.5 goes through the species in S to identify the species with the highest species_count (breaking ties arbitrarily), and calling it max. If species max does not overlap any of the species already in the solution set SOL, then max is added to SOL (block 3.7.7). Whether or not max was added to SOL, it is deleted from S (in block 3.7.8).

Block 3.7.9 checks to see if set S is empty or not. If S is not empty, then processing returns to the top of the loop at block 3.7.5. If S is empty, then processing is finished, and SOL contains the largest set of non-overlapping, feasible species in the current population (which is the final population of the run).

Computational Efficiencies:

It is well known that population-based, iterative algorithms such as GAs can be computationally intensive. Each member of the population must be evaluated each iteration (generation). Furthermore, GAs with sharing involve comparisons between each pair of individuals in a population of size M, resulting in $M(M+1)/2$ comparisons per generation. Furthermore, in the case of RFS, each comparison involves the calculation of the area of overlap between two geometric objects. For arbitrary shapes, area computations in general, and overlap computations in particular, are known to be prohibitively complex.

Therefore, in practice it is to be expected that methods of computational efficiencies will be sought, including approximations, archiving, and caching. Any such shortcuts or speedups that do not break with the spirit or intent of the methods and processes of this invention are considered to be covered by this invention. For example, it is common practice in sharing methods to approximate niche counts by taking a samples of the population and extrapolating, rather than compare every pair of individuals in the population (e.g., "Massive Multimodality, Deception, and Genetic Algorithms", Goldberg, D. E. et al., 1992). As another example, Horn (2002) used sampling to estimate the actual areas of overlap. Estimates rather than actual values can be substituted into the methods of this invention.

One other type of efficiency improvement involves the use of multiple processors operating in parallel to speed up the evaluation of a new population of individuals. While FIG. 3 depicts a single CPU processing the methods of the current invention, in fact the processing block in FIG. 3 could represent multiple CPUs acting as a single processing resource, even if distributed over a wide-area network of independent (but connected) machines.

Handling Additional Constraints:

In real-world settings, it is common to have additional constraints on the shape nesting problem. For example, for cutting fabric or wood, where there is a direction to the grain or pattern, it be required that all of the pieces be placed with the same orientation, so that they all have matching grain or pattern directions. Note that this is different from fixing the orientation from the start. Rather, the orientation can vary, and is thus a decision variable of the problem, but ALL pieces (species) that are part of the solution set must have the same orientation. If the current invention is used to solve such a problem, with some additional method for handling the uniform orientation" constraint, then such an implementation will still be an implementation of this invention.

FIG. 10 illustrates some of the flexibility of the current invention. FIG. 10a shows a problem in which the shaped piece is a regular polygon (in this case, a square), but the substrate has an arbitrary shape. FIG. 10c illustrates the complementary case, in which the substrate is square but the pieces have arbitrary shape, including concavity (many shape nesting algorithms and commercial software packages are limited to convex shapes). FIG. 10d shows a problem in which there is a constraint that the shaped pieces must be axis-aligned (that is, fixed rotation) squares. FIG. 10b shows a similar problem but with the constraint that the pieces can be rotated to either of only two orientations. Finally, FIG. 10d shows how the present invention makes no assumption about the topology of the substrate (or for that matter, of the pieces as well). Thus the substrate could have "no go" areas, such as holes or blemishes, such as the shaded area in FIG. 10d. The boundaries of such internal areas would be considered by the algorithm to be substrate boundaries, with the normal penalty given to piece placements that overlap any of those boundaries. Although not illustrated in any figures here, it is also possible to have holes in the pieces themselves. The invention does not have to be modified to handling such holes.

Example of Processing

FIGS. 15, 16, and 17 demonstrate the processing of the invention by showing actual results from a run on an implementation of the invention on a single two dimensional shape nesting problem. FIG. 15 plots all 1000 random members of the initial population in the lower part of the figure. The substrate cannot be seen because all members of the current population are shown. But when the threshold for plotting is raised by one, such that only species with species count of two or more (upper part of FIG. 15) are shown, then no species qualify and the substrate can be seen.

FIG. 16 shows that after 209 generations, the population has evolved so that there is a fairly good solution represented by species with at least 36 copies (see FIG. 16 upper). Lowering the species_count threshold in the lower part of FIG. 16, it can be seen that discovery operators are still at work, producing new individuals. Many of the newly created individuals have a great deal of overlap with other species, and some are infeasible (i.e., the overlap the substrate boundary). Most of these new individuals therefore receive low shared fitnesses and hence have few copies in the population.

FIG. 17 shows how the extracted optimal solution can improve over time. The three plots shown in FIG. 17 are all from the same run. By generation 159, the size of the optimal solution set is 8, but by generation 609 the solution set has grown to 9, thanks to some "movement" of pieces by discovery operators and selection.

What is claimed is:

1. A method of trying to locate a maximum number of complete and non-overlapping n dimensional shapes in an n dimensional substrate, where n is greater than zero, comprising:
   a) generating an initial population of shape positions;
   b) determining the resource-defined shared fitness of each member of the population, the resource-defined shared fitness of a member of a population being a function of that member's n dimensional size divided by the sum of a function of that member's n dimensional overlap with each member of the population, including itself;
   c) applying a selection operator to obtain a new population;
   d) repeating b) and c) a plurality of times; and then,
   e) extracting an optimal solution from a population.

2. The method of claim 1 wherein in b), the function of a member's n dimensional size is an increasing function of the n dimensional size of the respective member of the population.

3. The method of claim 1 wherein in b), the function of a member's n dimensional size is the n dimensional size of the respective member of the population.

4. The method of claim 1 wherein in b), the function of a member's n dimensional overlap with each member of the population, including itself, is an increasing function of the member's n dimensional overlap with each member of the population, including itself.

5. The method of claim 1 wherein in b), the function of a member's n dimensional overlap with each member of the population, including itself, is that member's n dimensional overlap with each member of the population, including itself.

6. The method of claim 1 wherein the resource-defined shared fitness of a member of a population that at least is partially outside the boundaries of the n dimensional substrate is assigned a reduced resource-defined shared fitness value.

7. The method of claim 1 wherein n=2.

8. The method of claim 1 wherein n=3.

9. The method of claim 1 wherein the selection operator comprises proportionate selection.

10. The method of claim 9 wherein the proportionate selection comprises a roulette-wheel selection.

11. The method of claim 1 wherein the selection comprises a continuously-updated tournament selection.

12. The method of claim 1 wherein in e), extracting an optimum solution in any population is accomplished by examining one or more solutions in the population.

13. The method of claim 12 wherein an optimal solution is extracted by successively eliminating species of the population having the lowest species counts until there are no overlaps among the remaining species, where a species is defined as members of the population having identical shapes, shape locations and orientations.

14. The method of claim 12 wherein an optimal solution is extracted by successively selecting a member of each species of the population having the highest species counts, as long as there are no overlaps among the selected species, until there are no more species to consider, where a species is defined as members of the population having identical shapes, shape locations and orientations.

15. The method of claim 1 wherein in d), a) through c) are repeated until at least one termination criterion has been met.

16. The method of claim 1 further comprised of applying a discovery operator to obtain a new population after c).

17. A method of trying to locate a maximum number of complete and non-overlapping n dimensional shapes in an n dimensional substrate, where n is greater than zero, comprising:
   a) generating an initial population of shape positions;
   b) determining the resource-defined shared fitness of each member of the population, the resource-defined shared fitness of a member of a population being a function of that member's n dimensional size divided by the sum of a function of that member's n dimensional overlap with each member of the population, including itself;
   c) applying a selection operator to obtain a new population;
   d) determining if at least one termination criterion has been met;
      i) if no termination criterion has been met, then extract an optimal solution from a population;
      ii) if at least one termination criterion has not been met, then returning and repeating from b) until at least one termination criterion has been met.

18. The method of claim 17 wherein in b), the function of a member's n dimensional size is an increasing function of the n dimensional size of the respective member of the population.

19. The method of claim 17 wherein in b), the function of a member's n dimensional size is the n dimensional size of the respective member of the population.

20. The method of claim 17 wherein in b), the function of a member's n dimensional overlap with each member of the population, including itself, is an increasing function of the member's n dimensional overlap with each member of the population, including itself.

21. The method of claim 17 wherein in b), the function of a member's n dimensional overlap with each member of the population, including itself, is that member's n dimensional overlap with each member of the population, including itself.

22. The method of claim 17 wherein the resource-defined shared fitness of a member of a population that at least is partially outside the boundaries of the n dimensional substrate is assigned a reduced resource-defined shared fitness value.

23. The method of claim 17 wherein n=2.

24. The method of claim 17 wherein n=3.

25. The method of claim 17 wherein the selection operator comprises proportionate selection.

26. The method of claim 25 wherein the proportionate selection comprises a roulette-wheel selection.

27. The method of claim 17 wherein the selection comprises a continuously-updated tournament selection.

28. The method of claim 17 wherein in d), determining if at least one termination criterion has been met in any population is accomplished by examining one or more solutions in the population.

29. The method of claim 28 wherein an optimal solution is extracted by successively eliminating species of the population having the lowest species counts until there are no overlaps among the remaining species, where a species is defined as members of the population having identical shapes, shape locations and orientations.

30. The method of claim 28 wherein an optimal solution is extracted by successively selecting a member of each species of the population having the highest species counts, as long as there are no overlaps among the selected species, until there are no more species to consider, where a species is defined as members of the population having identical shapes, shape locations and orientations.

31. The method of claim 17 further comprised of applying a discovery operator to obtain a new population after c).

32. A method of trying to locate a maximum number of complete and non-overlapping n dimensional shapes in an n dimensional substrate, where n is greater than zero, comprising:
   a) generating an initial population of shape positions;
   b) determining the resource-defined shared fitness of each member of the population, the resource-defined shared fitness of a member of a population being a function of that member's n dimensional size divided by the sum of a function of that member's n dimensional overlap with each member of the population, including itself;
   c) applying a selection operator to obtain a new population;
   d) applying a discovery operator to obtain a new population;
   e) repeating b) though d) a plurality of times; and then after c), extracting an optimal solution from a population.

33. The method of claim 32 wherein in b), the function of a member's n dimensional size is an increasing function of the n dimensional size of the respective member of the population.

34. The method of claim 32 wherein in b), the function of a member's n dimensional size is the n dimensional size of the respective member of the population.

35. The method of claim 32 wherein in b), the function of a member's n dimensional overlap with each member of the population, including itself, is an increasing function of the member's n dimensional overlap with each member of the population, including itself.

36. The method of claim 32 wherein in b), the function of a member's n dimensional overlap with each member of the population, including itself, is that member's n dimensional overlap with each member of the population, including itself.

37. The method of claim 32 wherein the resource-defined shared fitness of a member of a population that at least is partially outside the boundaries of the n dimensional substrate are assigned a reduced resource-defined shared fitness value.

38. The method of claim 32 wherein n=2.

39. The method of claim 32 wherein n=3.

40. The method of claim 32 wherein the selection operator comprises proportionate selection.

41. The method of claim 40 wherein the proportionate selection comprises a roulette-wheel selection.

42. The method of claim 32 wherein the selection comprises a continuously-updated tournament selection.

43. The method of claim 32 wherein in e), extracting an optimum solution in any population is accomplished by examining one or more solutions in the population.

44. The method of claim 43 wherein an optimal solution is extracted by successively eliminating species of the population having the lowest species counts until there are no overlaps among the remaining species, where a species is defined as members of the population having identical shapes and shape positions.

45. The method of claim 43 wherein an optimal solution is extracted by successively selecting a member of each species of the population having the highest species counts, as long as there are no overlaps among the selected species, until there are no more species to consider, where a species is defined as members of the population having identical shapes and shape positions.

46. The method of claim 32 in d), a) through c) are repeated until at least one termination criterion has been met.

47. A computer readable medium storing executable instructions thereon, which when executed, by at least one processing device, cause the at least one processing device to try to place a maximum number of complete and non-overlapping n dimensional shapes in an n dimensional substrate, where n>0, by:
   a) generating an initial population of shape positions;
   b) determining the resource-defined shared fitness of each member of the population, the resource-defined shared fitness of a member of a population being a function of that member's n dimensional size divided by the sum of a function of that member's n dimensional overlap with each member of the population, including itself;
   c) applying a selection operator to obtain a new population;
   d) repeating b) and c) a plurality of times; and then,
   e) extracting an optimal solution from a population.

48. The computer readable medium of claim 47 wherein in b), the function of a member's n dimensional size is an increasing function of the n dimensional size of the respective member of the population.

49. The computer readable medium of claim 47 wherein in b), the function of a member's n dimensional size is the n dimensional size of the respective member of the population.

50. The computer readable medium of claim 47 wherein in b), the function of a member's n dimensional overlap with each member of the population, including itself, is an increasing function of the member's n dimensional overlap with each member of the population, including itself.

51. The computer readable medium of claim 47 wherein in b), the function of a member's n dimensional overlap with each member of the population, including itself, is that member's n dimensional overlap with each member of the population, including itself.

52. The computer readable medium of claim 47 wherein the resource-defined shared fitness of a member of a population that at least is partially outside the boundaries of the n dimensional substrate is assigned a reduced resource-defined shared fitness value.

53. The computer readable medium of claim 47 wherein n=2.

54. The computer readable medium of claim 47 wherein n=3.

55. The computer readable medium of claim 47 wherein the selection operator comprises proportionate selection.

56. The computer readable medium of claim 55 wherein the proportionate selection comprises a roulette-wheel selection.

57. The computer readable medium of claim 47 wherein the selection comprises a continuously-updated tournament selection.

58. The computer readable medium of claim 47 wherein in e), extracting an optimal solution in any population is accomplished by examining one or more solutions in the population.

59. The computer readable medium of claim 58 wherein an optimal solution is extracted by successively eliminating species of the population having the lowest species counts until there are no overlaps among the remaining species, where a species is defined as members of the population having identical shapes, shape locations and orientations.

60. The computer readable medium of claim 58 wherein an optimal solution is extracted by successively selecting a member of each species of the population having the highest species counts, as long as there are no overlaps among the selected species, until there are no more species to consider, where a species is defined as members of the population having identical shapes, shape locations and orientations.

61. The computer readable medium of claim 47 wherein in d), a) through c) are repeated until at least one termination criterion has been met.

62. The computer readable medium of claim 61 wherein the instructions are further comprised of instructions for applying a discovery operator to obtain a new population after c).

63. The computer readable medium of claim 47 wherein the instructions are further comprised of instructions for applying a discovery operator to obtain a new population after c).

* * * * *